(12) United States Patent
Oikawa et al.

(10) Patent No.: US 8,701,631 B2
(45) Date of Patent: Apr. 22, 2014

(54) PRESSURE RELIEF VALVE AND HIGH PRESSURE PUMP WITH SUCH VALVE

(75) Inventors: Shinobu Oikawa, Kariya (JP);
Yoshinori Yamashita, Kariya (JP);
Katsunori Furuta, Obu (JP); Masayuki Kobayashi, Kasugai (JP); Shigeto Tsuge, Okazaki (JP)

(73) Assignee: Denso Corporation, Kariya (JP)

( * ) Notice: Subject to any disclaimer, the term of this patent is extended or adjusted under 35 U.S.C. 154(b) by 484 days.

(21) Appl. No.: 13/161,744

(22) Filed: Jun. 16, 2011

(65) Prior Publication Data
US 2011/0315005 A1    Dec. 29, 2011

(30) Foreign Application Priority Data

Jun. 29, 2010  (JP) ................................. 2010-147695
Jan. 28, 2011  (JP) ................................. 2011-16967

(51) Int. Cl.
 *F02M 69/54* (2006.01)
 *F16K 15/00* (2006.01)
 *F02D 41/38* (2006.01)
 *F16K 15/02* (2006.01)

(52) U.S. Cl.
 CPC ........... *F02M 69/54* (2013.01); *F02D 41/3863* (2013.01); *F16K 15/026* (2013.01)
 USPC ....... 123/457; 123/506; 137/469; 137/543.21

(58) Field of Classification Search
 CPC .... F16K 15/026; F16K 15/021; F02M 69/54; F02D 41/3863
 USPC .......... 123/457, 459, 462, 506, 510, 511, 514
 See application file for complete search history.

(56) References Cited

U.S. PATENT DOCUMENTS

| | | | | |
|---|---|---|---|---|
| 4,489,697 A * | 12/1984 | Kawatei | ........................ | 123/502 |
| 4,520,843 A * | 6/1985 | Debrunner, Jr. | .............. | 137/469 |
| 6,189,562 B1 * | 2/2001 | Lorentz | ......................... | 137/469 |

(Continued)

FOREIGN PATENT DOCUMENTS

| | | |
|---|---|---|
| JP | H07-035251 | 2/1995 |
| JP | H08-296528 | 11/1996 |

(Continued)

OTHER PUBLICATIONS

Office Action (2 pages) dated Sep. 6, 2013, issued in corresponding Japanese Application No. 2012-178110 and English translation (4 pages).

(Continued)

*Primary Examiner* — Thomas Moulis
(74) *Attorney, Agent, or Firm* — Nixon & Vanderhye PC

(57) ABSTRACT

A valve member of a pressure relief valve has a shaft portion, a pressure receiving portion, and a guide portion, wherein the valve member is axially movable in a fuel return passage. When a forward end of the shaft portion is seated on a valve seta, the fuel return passage is closed, while the shaft portion is separated from the valve seat the fuel return passage is opened. A notched portion is formed at an outer wall of the guide portion to thereby form an outer-surface passage. A fuel inlet port is formed in the valve member for communicating a fuel inlet chamber to the fuel return passage at a downstream side of the valve member.

11 Claims, 18 Drawing Sheets

(56) References Cited

U.S. PATENT DOCUMENTS

| | | | |
|---|---|---|---|
| 6,244,253 B1 | 6/2001 | Haeberer et al. | |
| 2003/0034073 A1* | 2/2003 | Roth | 137/541 |
| 2011/0125387 A1* | 5/2011 | Suzuki et al. | 701/103 |
| 2011/0147636 A1* | 6/2011 | Oikawa | 251/336 |
| 2011/0315909 A1* | 12/2011 | Oikawa et al. | 251/337 |
| 2013/0306166 A1* | 11/2013 | Erb | 137/469 |

FOREIGN PATENT DOCUMENTS

| | | |
|---|---|---|
| JP | H11-062773 | 3/1999 |
| JP | H11-270431 | 10/1999 |
| JP | P2000-065227 A | 3/2000 |
| JP | 2004-138062 | 5/2004 |
| JP | 2009-257197 | 11/2009 |

OTHER PUBLICATIONS

Japanese Office Action dated Jun. 22, 2012, issued in corresponding Japanese Application No. 2011-016967 with English translation.

* cited by examiner

PRESSURE RELIEF VALVE AND HIGH PRESSURE PUMP WITH SUCH VALVE

CROSS REFERENCE TO RELATED APPLICATION

This application is based on Japanese Patent Applications No. 2010-147695 filed on Jun. 29, 2010, and No. 2011-016967 filed on Jan. 28, 2011, the disclosures of which are incorporated herein by reference.

FIELD OF THE INVENTION

The present invention relates to a pressure relief valve provided in a fuel supply system for supplying fuel to an internal combustion engine and further relates to a high pressure pump using such pressure relief valve.

BACKGROUND OF THE INVENTION

In a conventional fuel supply system for an internal combustion engine, a high pressure pump is provided for pressurizing fuel. The fuel pressurized by the high pressure pump is supplied to a delivery pipe and accumulated therein. The high pressure fuel is then injected into respective cylinders of the engine via injectors connected to the delivery pipe.

The fuel supply system and the high pressure pump are disclosed, for example, in Japanese Patent Publication No. 2004-138062, and an International Patent Publication No. 2002-515565 (publication in Japanese). According to the above prior arts, a pressure relief valve is provided in a fuel supply system in order to avoid the following situation. Namely, when any malfunction occurs in controlling the high pressure pump, fuel pressure in the delivery pipe may become excessively high and the injectors become unable to perform fuel injection operation. And the delivery pipe may be damaged by such excessively high fuel pressure. The pressure relief valve is provided in a fuel return passage, which is connected between a high-pressure side fuel passage and a low-pressure side fuel passage. The high-pressure side fuel passage corresponds to a passage formed at a downstream side of a fuel discharge valve, which discharges a high pressure fuel pressurized by a fuel pressurizing chamber of the high pressure pump. The low-pressure side passage corresponds to a passage formed at an upstream side of the fuel discharge valve. The pressure relief valve is opened, when a differential pressure between the high-pressure side fuel passage and the fuel pressurizing chamber becomes higher than a predetermined pressure set by the pressure relief valve, so as to decrease the fuel pressure in the high-pressure side fuel passage.

According to the pressure relief valve (JP 2004-138062), a valve member is formed in a ball shape. Therefore, a force of flowing fuel (a dynamic pressure of the fuel) may not be sufficiently applied to the valve member when the pressure relief valve is opened. It would need a certain time period, during which the valve member is lifted from (separated from) a valve seat by a sufficient amount of stroke. It is, therefore, difficult to quickly decrease the fuel pressure in the high-pressure side fuel passage. Then, it may happen that the fuel pressure in the delivery pipe becomes higher than a fuel pressure for enabling the fuel injection operation by the injectors. In addition, the delivery pipe may be damaged.

According to the pressure relief valve, for example, as shown in FIG. 1 of JP 2002-515565, a valve member has a column shaped shaft portion extending from a forward end (a valve seat side) in an axial direction of a fuel return passage, a conical portion extending from a rear end of the column shaped shaft in a radial outward direction, and a guide portion extending from an outer periphery of the conical portion in the axial direction, the guide portion sliding on an inner surface of the fuel return passage. A flow restricting element is further provided at an upstream side of the valve seat for controlling fuel flow. According to the above structure, the dynamic pressure of the fuel may not be effectively applied to the conical portion at the valve opening time of the pressure relief valve. It would need a certain time period for sufficiently opening the pressure relief valve. Therefore, it may be difficult to quickly reduce the fuel pressure in the high-pressure side fuel passage.

In addition, according to the pressure relief valve, as shown in FIG. 3 of JP 2002-515565, a flow restricting portion is formed at the conical portion of the valve member in addition to the flow restricting element at the upstream side of the valve seat. According to such a structure, it would take a time for the valve member to be seated on the valve seat when the pressure relief valve is to be closed, because fuel pressure in a chamber between the flow restricting element at the upstream side of the valve seat and the flow restricting portion of the conical portion is applied to the conical portion of the valve member. In a case that the pressure relief valve does not surely close the fuel return passage, vibration may be generated in the fuel pressure of the delivery pipe. Furthermore, the pressure relief valve may be re-opened by pressure wave of the fuel, which is transmitted from the high-pressure side passage to the fuel return passage. Then, the fuel pressure in the delivery pipe may be drastically decreased. It may deteriorate the fuel injection from the injectors.

SUMMARY OF THE INVENTION

The present invention is made in view of the above problems. It is an object of the present invention to provide a pressure relief valve, according to which a differential pressure between a fuel inlet chamber and a fuel passage at a downstream side of a valve member is assured when the pressure relief valve is opened, while the differential pressure between the fuel inlet chamber and the fuel passage at the downstream side of the valve member can be quickly decreased when the pressure relief valve is to be closed. It is another object of the present invention to provide a high pressure pump having the above pressure relief valve.

According to a feature of the present invention, for example, as defined in the appended claim 1, in a pressure relief valve for a high pressure pump, a fuel flow from a high pressure side to a low pressure side is allowed but a fuel flow from the low pressure side to the high pressure side is prohibited. The pressure relief valve has; a valve seat formed at an inner wall of a fuel return passage provided between the high pressure side and the low pressure side; a valve member for closing the fuel return passage when the valve member is seated on the valve seat, and for opening the fuel return passage when the valve member is separated from the valve seat; and a biasing means for biasing the valve member toward the valve seat at a predetermined biasing force.

The valve member has a shaft portion, a pressure receiving portion, a guide portion, a notched portion and a fuel inlet port.

The shaft portion extends in an axial direction of the fuel return passage toward the valve seat, a forward end of the shaft portion being seated on and/or separated from the valve seat.

The pressure receiving portion extends from a rear end of the shaft portion in a radial outward direction toward an inner wall of the fuel return passage, so that a fuel inlet chamber is formed in the fuel return passage between the valve seat and the pressure receiving portion.

The guide portion extends from an outer periphery of the pressure receiving portion in an axial direction of the fuel return passage, which is opposite to a direction toward the valve seat, wherein the guide portion slides on the inner wall of the fuel return passage.

The notched portion is formed at an outer wall of the guide portion so as to form an outer-surface passage for communicating the fuel inlet chamber to the fuel return passage at a downstream side of the valve member.

The fuel inlet port has one end opened at the shaft portion or the pressure receiving portion and another end opened to the fuel return passage at the downstream side of the valve member, so that the fuel inlet port communicates the fuel inlet chamber to the fuel return passage at the downstream side of the valve member.

When the fuel pressure pumped out from the high pressure pump becomes higher than a target control value, a differential pressure between a high-pressure side fuel passage and a low-pressure side fuel passage may become larger than a valve opening pressure of the pressure relief valve. Then, the valve member is separated from the valve seat so that the fuel flows into the fuel inlet chamber from the fuel passage at an upstream side of the valve seat.

According to the above feature of the invention (the feature of the claim 1), a size, a shape, an angle and the like of the notched portions and the fuel inlet ports are properly adjusted so that the differential pressure is generated between the fuel inlet chamber and the fuel passage at the downstream of the valve member when the pressure relief valve is opened. As a result, the dynamic pressure of the fuel, which has entered into the fuel inlet chamber from the fuel passage at the upstream of the valve member, is applied to the pressure receiving portion and the valve member is moved by an appropriate stroke amount in a short time period. In other words, when the stroke amount as well as a valve opening speed of the pressure relief valve is properly adjusted, it becomes possible to return the fuel from the high-pressure side fuel passage to the low-pressure side fuel passage, wherein a flow amount of such return fuel is equal to or close to a fuel discharge amount supplied from the fuel pressurizing chamber of the high pressure pump to the delivery pipe in an operation of a vehicle retreat running. Accordingly, the fuel pressure in the high-pressure side fuel passage can be quickly reduced.

When the differential pressure between the high-pressure side fuel passage and the low-pressure side fuel passage becomes smaller than the valve opening pressure of the pressure relief valve, the valve member is moving toward the valve seat. In this operation, the fuel in the fuel inlet chamber quickly flows to the fuel return passage at the downstream side of the valve member through the outer-surface passage and the fuel inlet port. In particular, the fuel inlet port effectively contributes in the quick flow of the fuel from the fuel inlet chamber to the downstream side of the fuel return passage. The differential pressure between the fuel inlet chamber and the fuel passage at the downstream of the valve member becomes at once zero or close to zero. It is, therefore, possible to increase a valve closing speed of the valve member. It is also possible to suppress re-open of the pressure relief valve as well as vibration of the fuel pressure in the delivery pipe, which may be caused by the pressure wave generated in the high-pressure side fuel passage. As above, the fuel pressure in the delivery pipe can be maintained at the predetermined pressure set at the pressure relief valve, so that the high pressure fuel can be properly injected from the injectors.

The high-pressure side fuel passage may include a fuel discharge passage at a downstream side of a valve seat of a discharge valve of the high pressure pump, a high pressure fuel supply pipe between a fuel outlet of the high pressure pump and the delivery pipe, and the delivery pipe itself. On the other hand, the low-pressure side fuel passage may include the fuel pressurizing chamber, a fuel supply passage between a fuel inlet of the high pressure pump and the fuel pressurizing chamber, a low pressure fuel supply pipe between the high pressure pump and a fuel tank, a fuel return pipe for returning an excessive fuel to the fuel tank, and the fuel tank itself.

The valve opening pressure of the pressure relief valve can be set at an optional value by a biasing force of the spring and so on. For example, the valve opening pressure is set at a value higher than the fuel pressure in the high-pressure side fuel passage at a normal operation of the internal combustion engine, but lower than the fuel pressure at which the injectors may become unable to carry out fuel injecting operation.

It is, of course, possible to provide the fuel inlet port at any optional position with respect to the notched portion, when viewed the valve member in an axial direction thereof.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

The present invention will be explained by way of multiple embodiments with reference to the drawings.

First Embodiment

A pressure relief valve according to a first embodiment of the present invention will be explained with reference to FIGS. 1 to 8.

Figure 1:
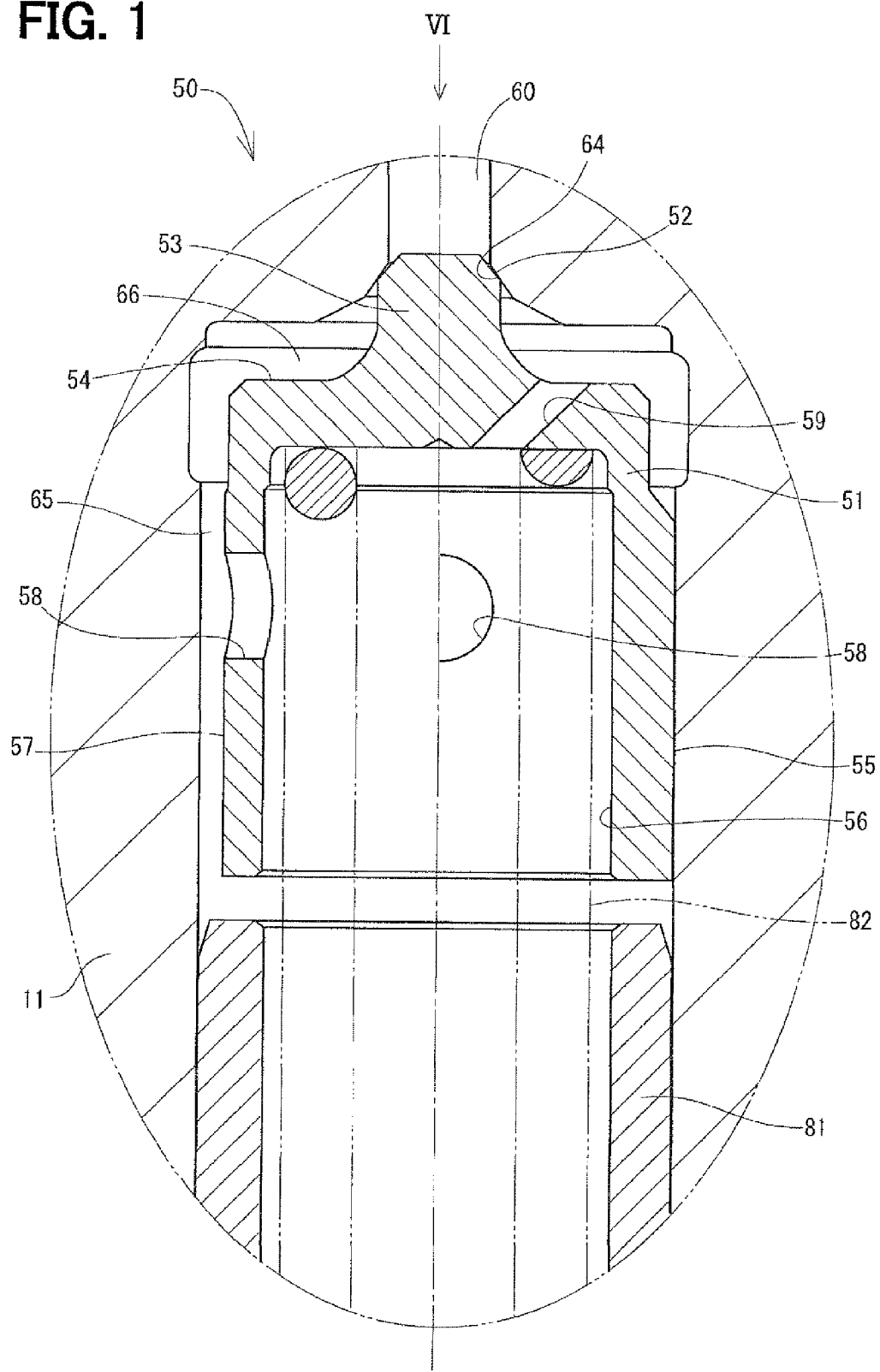
FIG. 1 is a schematic cross sectional view showing a relevant portion of a pressure relief valve according to a first embodiment of the present invention, wherein the pressure relief valve is in a valve closed condition.
Figure 2:
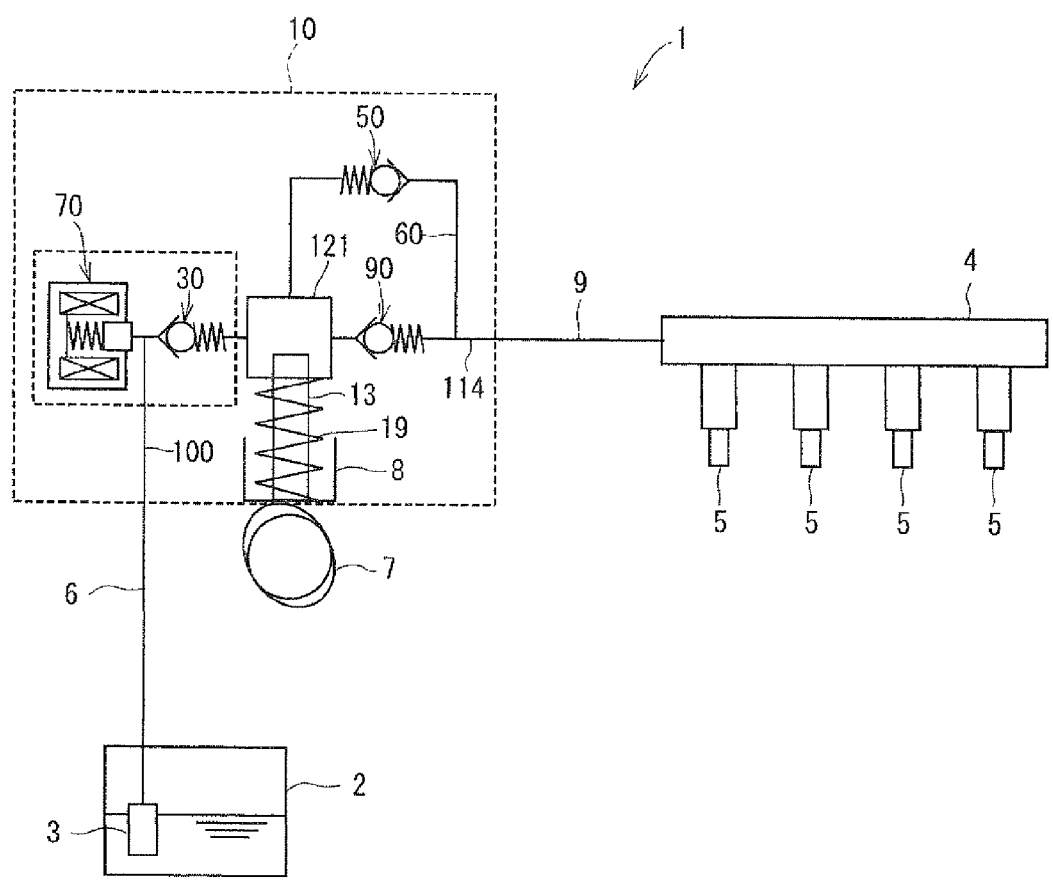
FIG. 2 is a schematic view showing a fuel supply system, to which the pressure relief valve of the first embodiment of the present invention is applied.

As shown in FIG. 2, the pressure relief valve 50 of the present embodiment is provided in a high pressure pump 10 used for a fuel supply system 1 of an internal combustion engine. In the fuel supply system 1, fuel drawn up by a low pressure pump 3 from a fuel tank 2 is supplied to a fuel supply passage 100 of the high pressure pump 10 via a low pressure fuel supply pipe 6. The high pressure pump 10 pressurizes the fuel, which is supplied into a fuel pressurizing chamber 121 via the fuel supply passage 100, by a reciprocal movement of a plunger 13 in its axial direction, so as to pump out the pressurized fuel via a discharge passage 114. The high pressure fuel pumped out from the discharge passage 114 is supplied to a delivery pipe 4 via a high pressure fuel supply pipe 9. The high pressure fuel is injected into respective cylinders of the internal combustion engine from each of fuel injectors 5 connected to the delivery pipe 4.

A fuel return passage 60 connects the discharge passage 114 and the fuel pressurizing chamber 121 of the high pressure pump 10 with each other. The pressure relief valve 50 is provided in the fuel return passage 60. The pressure relief valve 50 is opened when a pressure difference between fuel pressure in the discharge passage 114 and fuel pressure in the fuel pressurizing chamber 121 becomes larger than a predetermined value, so that a part of the fuel flows from the discharge passage 114 into the fuel pressurizing chamber 121.

Figure 3:
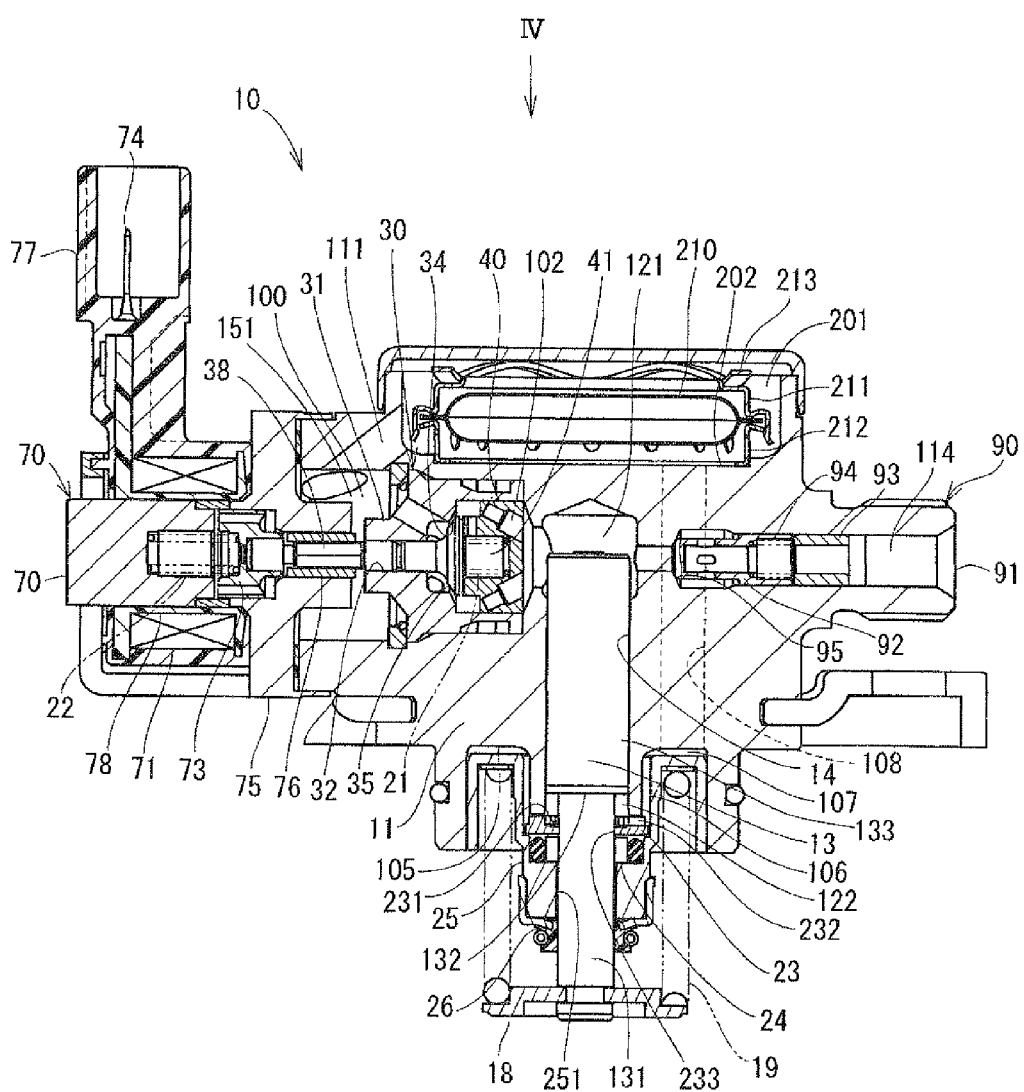
FIG. 3 is a schematic cross sectional view showing a high pressure pump having the pressure relief valve of the first embodiment of the present invention.
Figure 4:
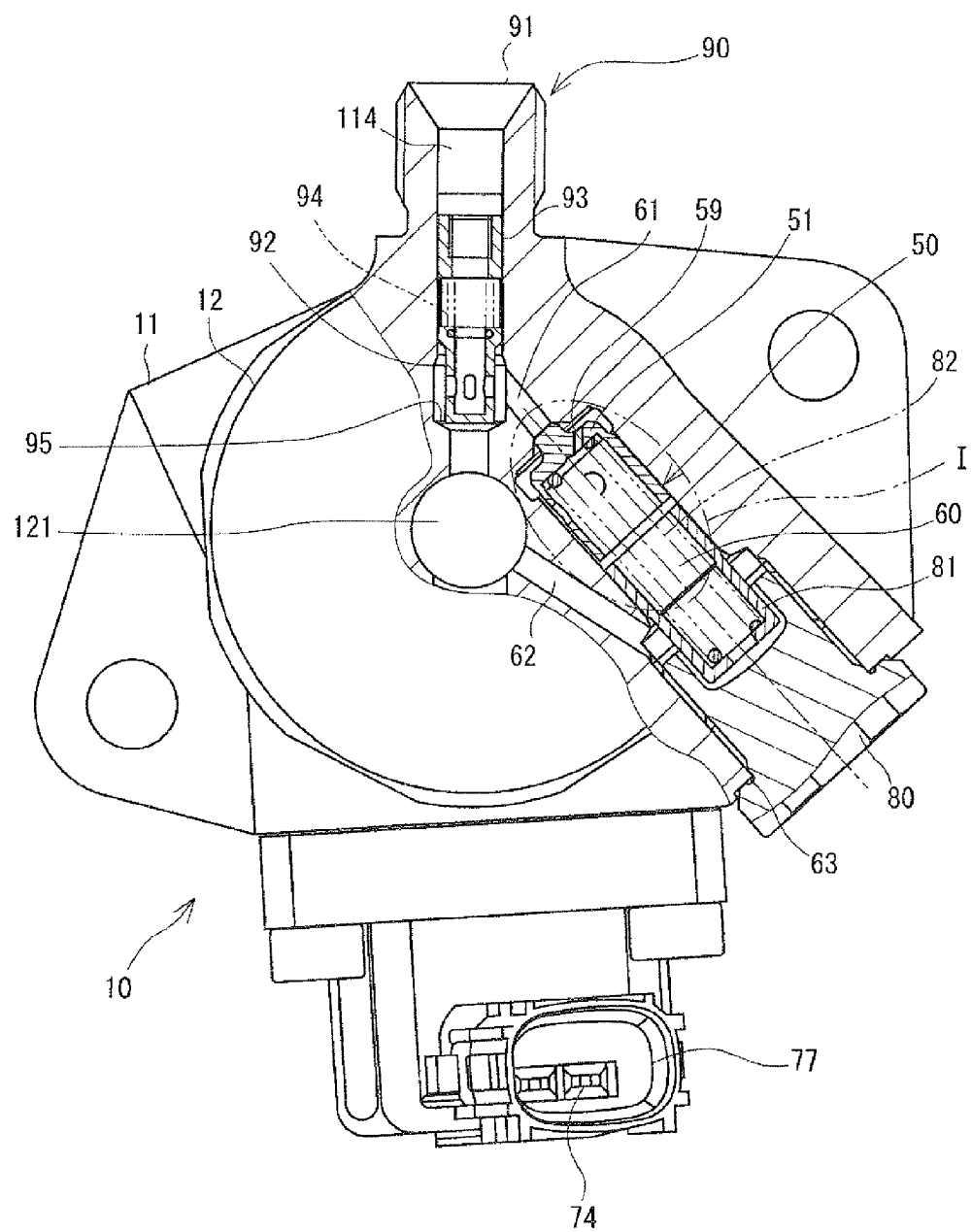
FIG. 4 is a schematic top plan view, including a partial cross sectional view, when viewed in a direction indicated by an arrow IV in FIG. 3.

A structure of the high pressure pump 10 will be explained with reference to FIGS. 3 and 4.

The high pressure pump 10 has a pump body 11, the plunger 13, a pulsation damper 210, a fuel intake valve unit 30, the pressure relief valve 50 and so on.

A cylinder 14 is formed in the pump body 11. The plunger 13 is movably accommodated in the cylinder 14 in a reciprocating manner in its axial direction, so that the fuel pressurizing chamber 121 is formed at an upper end of the plunger 13. A spring holder 18 is attached to a lower end of the plunger 13, which is an end on an opposite side to the fuel pressurizing chamber 121. A spring 19 is provided between the spring holder 18 and an oil seal holder 25 (explained below). One end of the spring 19 is engaged with the oil seal holder 25, while the other end thereof is engaged with the spring holder 18, so that the spring 19 applies an expanding force to them in the axial direction. As a result, the lower end of the plunger 13 is brought into contact with a cam formed on a cam shaft 7 via a tappet 8 (FIG. 2), so that the plunger 13 is reciprocated in the axial direction. A volume of the fuel pressurizing chamber 121 is changed due to the reciprocal movement of the plunger 13, to thereby pressurize the fuel and pump out the fuel.

A damping chamber 201 is formed in the pump body 11. The damping chamber 201 is communicated to a fuel inlet (not shown) via a fuel passage (not shown). The fuel inlet is connected to the low pressure fuel supply pipe 6 (FIG. 2), so that the fuel from the fuel tank 2 is supplied into the damping chamber 201 from the fuel inlet through the fuel passage. The pulsation damper 210 is provided in the damping chamber 201 in order to decrease pulsation of the fuel pressure. The pulsation damper 210 is supported by a pair of supporting members 211 and 212, which are pushed into a recessed portion 202 of the damping chamber 201 by elastic force of a wave-shaped blade spring 213.

The fuel intake valve unit 30 is composed of a valve body 31, an intake valve member 35, a valve stopper 40 and an electromagnetic driving portion 70.

A fuel intake passage 151 is formed in the pump body 11 in such a manner that an axial line of the fuel intake passage 151 is almost perpendicular to a center axial line of the cylinder 14. One end of the fuel intake passage 151 is communicated to the fuel pressurizing chamber 121, while the other end thereof is communicated to the damping chamber 201 through a fuel communication passage 111. The valve body 31 is fixed to the fuel intake passage 151 at a side of the fuel pressurizing chamber 121. An intake valve seat 34, which is in a concave tapered shape, is formed in the valve body 31 at the side of the fuel pressurizing chamber 121.

The intake valve member 35 provided in an inside of the valve body 11 is guided by a through-hole 32 formed in the valve body 31 and reciprocated in the axial direction. A sealing surface, which is in a convex tapered shape, is formed in the intake valve member 35, so that the sealing surface is brought into contact with the intake valve seat 34.

The valve stopper 40 is fixed to an inner wall surface of the valve body 31 for restricting a movement of the intake valve member 35 in a right-hand direction (that is, a valve opening direction). A recessed chamber 41 is formed in the valve stopper 40, which is opened toward the intake valve member 35, for accommodating a spring 21 (a valve-body side spring). The valve-body side spring 21 biases the intake valve member 35 toward the intake valve seat 34, that is, a valve closing direction.

Multiple inclined fuel passages 102 are formed in the valve stopper 40, wherein the fuel passages 102 are inclined with respect to the axial line of the valve stopper 40. The fuel, which is supplied into the fuel intake passage 151 from the damping chamber 201 through the fuel communication passage 111, flows into the fuel pressurizing chamber 121 through the inclined fuel passages 102 when the intake valve member 35 is moved to a valve opened position during a fuel intake stroke of the high pressure pump 10.

A fuel supply passage 100 is composed of the fuel passage (not shown) for connecting the fuel inlet (not shown) to the damping chamber 201, the damping chamber 201, the fuel communication passage 111, the fuel intake passage 151 and the inclined fuel passages 101.

The electromagnetic driving portion 70 is composed of a coil 71, a fixed core 72, a movable core 73 and so on. The coil 71 is wound on a spool 78 made of resin. The fixed core 72 is made of magnetic material and provided in an inside of the spool 78. The movable core 73 is also made of magnetic material and movably provided at an axial side of the fixed core 72 to the fuel pressurizing chamber 121, so that the movable core 73 is movable in a reciprocating manner in the axial direction.

A spring (a coil side spring) 22 is provided between the fixed core 72 and the movable core 73. The coil side spring 22 biases the movable core 73 toward the fuel pressurizing chamber 121, that is, a valve opening direction of the intake valve member 35, wherein a biasing force of the coil side spring 22 is larger than that of the valve-body side spring 21.

The electromagnetic driving portion 70 is fixed to the pump body 11 by a housing member 75 for closing an open end of the fuel intake passage 151, which is formed on a side of the pump body 11 opposite to the fuel pressurizing chamber 121.

A needle 38 is formed in a column shape and movably supported in a through-hole 76 formed in the housing member 75, so that the needle 38 is movable in a reciprocating manner in the axial direction. One end of the needle 38 is fixed to the movable core 73, while the other end thereof is in contact with the intake valve member 35.

When no electric power is supplied to the coil 71, the movable core 73 and the needle 38 fixed thereto push the intake valve member 35 by the coil side spring 22 in the right hand direction to open a fuel intake valve (35).

When the electric power is supplied to the coil 71 via a terminal 74 of a connector 77, the coil 71 generates magnetic field so that magnetic flux flows in a magnetic circuit formed by the fixed core 72, the movable core 73 and the housing member 75. As a result, the movable core 73 is attracted toward the fixed core 72 against the spring force of the coil side spring 22. Therefore, the needle 38 fixed to the movable core 73 is moved in the left hand direction toward the fixed core 72 to close the fuel intake valve (35).

A fuel discharge valve unit 90 is composed of a discharge valve member 92, a limiting member 93, a discharge valve side spring 94 and so on.

A fuel discharge passage 114 is formed in the pump body 11 at a side of the fuel pressurizing chamber 121 opposite to the fuel intake passage 151. A fuel outlet 91 is communicated to the fuel pressurizing chamber 121 through the fuel discharge passage 114.

The discharge valve member 92 is formed in a cylindrical shape having a closed end and movably accommodated in the fuel discharge passage 114 to reciprocate therein. When the discharge valve member 92 is seated on a valve seat 95, which is formed in an inner wall of the fuel discharge passage 114, the fuel discharge passage 114 is closed, while the discharge valve member 92 is separated from the valve seat 95, the fuel discharge passage 114 is opened.

The limiting member 93 is fixed to the inner wall of the fuel discharge passage 114. One end of the discharge valve side spring 94 is engaged with the limiting member 93, while the other end thereof is engaged with the discharge valve member 92, so as to bias the discharge valve member 92 toward the valve seat 95.

The discharge valve member 92 is separated from the valve seat 95, when a valve opening force applied to the discharge valve member 92 by the fuel pressure from the fuel pressurizing chamber 121 becomes larger than a valve closing force, which is a sum of fuel pressure by the fuel in the fuel discharge passage 114 (at a downstream side of the valve seat 95) and a spring biasing force of the discharge valve side spring 94. As a result, the fuel from the fuel pressurizing chamber 121 is pumped out to the outside of the high pressure pump 10 from the fuel outlet 91 via the fuel discharge passage 114.

On the other hand, the discharge valve member 92 is seated on the valve seat 95, when the valve opening force applied to the discharge valve member 92 by the fuel pressure from the fuel pressurizing chamber 121 becomes smaller than the valve closing force, which is the sum of fuel pressure by the fuel in the fuel discharge passage 114 and the spring biasing force of the discharge valve side spring 94. As a result, it is possible to prevent the fuel in the fuel discharge passage 114 from flowing back into the fuel pressurizing chamber 121.

A volume variable chamber 122 will be explained.

The plunger 13 has a large-diameter portion 133 on a side to the fuel pressurizing chamber 121 and a small-diameter portion 131 on a side opposite to the fuel pressurizing chamber 121. A stepped surface portion 132 is formed between the large-diameter and the small-diameter portions 133 and 131.

An upper end surface of a plunger stopper 23 is in contact with a lower end surface of the pump body 11 (more exactly, a lower end of the cylinder 14 thereof). A through-hole 233, which extends in a thickness direction of the plunger stopper 23, is formed at a center of the plunger stopper 23. The small-diameter portion 131 of the plunger 13 is inserted through the through-hole 233. A circular shaped recessed portion 231, which is recessed in a downward direction (in a direction opposite to the fuel pressurizing chamber 121), is formed at an upper side of the plunger stopper 23. In addition, a grooved passage 232 is formed at the upper side of the plunger stopper 23. The grooved passage 232 extends in a radial direction from the recessed portion 231 to a circumferential end of the plunger stopper 23.

An annular recessed portion 105 is formed in a lower side of the pump body 11 at an outer wall of the cylinder 14, wherein the annular recessed portion 105 is upwardly recessed toward the fuel pressurizing chamber 121. The oil seal holder 25 is inserted into the recessed portion 105. The small-diameter portion 131 of the plunger 13 is inserted through a through-hole 251 formed in the oil seal holder 25. The plunger stopper 23 and a fuel seal member 24 are interposed between the lower end surface of the pump body 11 and the oil seal holder 25. The oil seal holder 25 is fixed to an inner wall of the annular recessed portion 105 of the pump body 11.

The fuel seal member 24 restricts a thickness of an oil film of the fuel around the small-diameter portion 131 and suppresses a leakage of the fuel to the internal combustion engine, which may be caused by a reciprocating operation of the plunger 13. An oil seal member 26 is attached to a lower side of the oil seal holder 25, which is a side of the oil seal holder 25 opposite to the fuel pressurizing chamber 121. The oil seal member 26 restricts likewise a thickness of an oil film of lubricating oil around the small-diameter portion 131 and suppresses a leakage of the lubricating oil to the internal combustion engine, which may be caused by the reciprocating operation of the plunger 13.

The volume variable chamber 122 is formed by the stepped surface portion 132, an outer wall of the small-diameter portion 131, an inner wall of the cylinder 14, the recessed portion 231, and a space surrounded by the fuel seal member 24.

A tube-shaped fuel passage 106 and an annular fuel passage 107 communicated to the tube-shaped fuel passage 106 are formed between the oil seal holder 25 and the pump body 11. The tube-shaped fuel passage 106 is communicated with the grooved passage 232 of the plunger stopper 23. The annular fuel passage 106 is communicated to the damping chamber 201 through a return path 108 formed in the pump body 11. Therefore, the volume variable chamber 122 is communicated to the damping chamber 201 through the grooved passage 232, the tube-shaped fuel passage 106, the annular fuel passage 107 and the return path 108.

A volume of the volume variable chamber 122 is changed in accordance with the reciprocal movement of the plunger 13. When the plunger 13 is upwardly moved during a fuel amount adjusting stroke, the volume of the fuel pressurizing chamber 121 is decreased, while the volume of the volume variable chamber 122 is increased. About 60% of the low pressure fuel, which is discharged from the fuel pressurizing chamber 121 to the damping chamber 201, is sucked into the volume variable chamber 122 from the damping chamber 201. As a result, the pulsation of the fuel pressure can be reduced by 60%.

When the plunger 13 is downwardly moved during the fuel intake stroke, the volume of the fuel pressurizing chamber 121 is increased, while the volume of the volume variable chamber 122 is decreased. About 60% of the fuel, which is sucked into the fuel pressurizing chamber 121, is supplied from the volume variable chamber 122, while the remaining 40% of the fuel is supplied from the fuel inlet (not shown). As a result, fuel sucking efficiency of the fuel pressurizing chamber 121 is improved.

The pressure relief valve 50 will be explained with reference to FIGS. 1 and 4 to 6.

A fuel return passage 60 is provided in the pump body 11 in a plane perpendicular to a center axis of the cylinder 14. The fuel return passage 60 is composed of a first fuel return passage 61 (a discharge-valve side return passage), which communicates a cylindrical space 63 formed in the pump body 11 to the discharge passage 114 at a downstream side of the valve seat 95, and a second fuel return passage 62 (a pressurizing-chamber side return passage), which communicates the cylindrical space 63 to the fuel pressurizing chamber 121. The cylindrical space 63 is closed by a plug member 80. Accordingly, the fuel return passage 60 (61, 62) communicates the fuel pressurizing chamber 121 to the discharge passage 114 at a position between the valve seat 95 and the fuel outlet 91.

The pressure relief valve 50 is composed of a valve member 51, an adjusting pipe 81, a spring 82 and so on.

The valve member 51 is movably provided in the fuel return passage 60 so that the valve member 51 is reciprocal in the fuel return passage 60. A valve seat 64, which is in a concave tapered shape, is formed at an inner wall of the fuel return passage 60 on a side closer to the discharge passage 114. A valve sealing surface 52, which is in a convex tapered shape, is formed at a forward end of the valve member 51. The fuel return passage 60 is closed when the valve sealing surface 52 is seated on the valve seat 64, while the fuel return passage 60 is opened when the valve sealing surface 52 is separated from the valve seat 64.

The valve member 51 has a shaft portion 53 extending from the valve sealing surface 52 in an axial downstream direction of the fuel return passage 60 (in a downward direction in FIG. 5), a pressure receiving portion 54 extending from a downstream end (a rear end) of the shaft portion 53 in a radial outward direction toward an inner peripheral surface of the fuel return passage 60, a guide portion 55 extending from an outer periphery of the pressure receiving portion 54 in an axial downstream direction (that is, a direction opposite to the valve sealing surface 52), and so on. Those portions (53, 54 and 55) are integrally formed.

The shaft portion 53 is formed in a column shape. The pressure receiving portion 54 is formed by a flat surface perpendicular to axis of the shaft portion 53. The guide portion 55 is formed in a tubular shape, wherein an outer diameter thereof is made to be slightly smaller than an inner diameter of the fuel return passage 60. Accordingly, the guide portion 55 may slide on an inner wall of the fuel return passage 60 and axially reciprocate. A recessed portion 56, which is opened to the fuel return passage 60 in a downstream direction, is formed in an inside of the guide portion 55.

The valve member 51 has a pair of notched portions 57 at an outer surface of the guide portion 55. The notched portions 57 are formed at opposite sides in a radial direction, so that a distance between the notched portions 57 is smaller than an outer diameter of the guide portion 55. The notched portions 57 are formed by flat surfaces at the outer surface of the guide portion 55. As a result, outer-surface passages 65 are respectively formed between the notched portions 57 and the inner surface of the fuel return passage 60.

A communication hole 58 is formed in the valve member 51 at each of the notched portions 57, so that the outer-surface passage 65 and an inside passage of the recessed portion 56 are communicated to each other via the communication hole 58.

A fuel inlet chamber 66 is formed in the fuel return passage 60 between the valve seat 64 and the pressure receiving portion 54. The fuel inlet chamber 66 extends from the shaft portion 53 in a radial direction and the fuel flows into the fuel inlet chamber 66 from the valve seat 64 when the pressure relief valve 50 is opened. A dynamic pressure of the fuel flowing into the fuel inlet chamber 66 is applied to the pressure receiving portion 54. A cross sectional area of the outer-surface passage 65 is set by the notched portion 57. A desired differential pressure, which is generated between the fuel inlet chamber 66 and the inside passage of the recessed portion 56 when the pressure relief valve 50 is opened, is achieved by adjusting the cross sectional area of the outer-surface passage 65. As a result, it is possible to control a valve opening speed and a valve stroke of the valve member 5

The valve member 51 has a pair of fuel inlet ports 59, each one end of which (an upper end in FIG. 5) is opened at the pressure receiving portion 54 and each other end of which is opened at the inner wall of the recessed portion 56. Each fuel inlet port 59 is inclined toward a center axis of the valve member 51. The upper end of the fuel inlet port 59 is opened at the pressure receiving portion 54 at a sharp angle, which is preferably less than 60 degrees, or more preferably less than 45 degrees.

Figure 6:
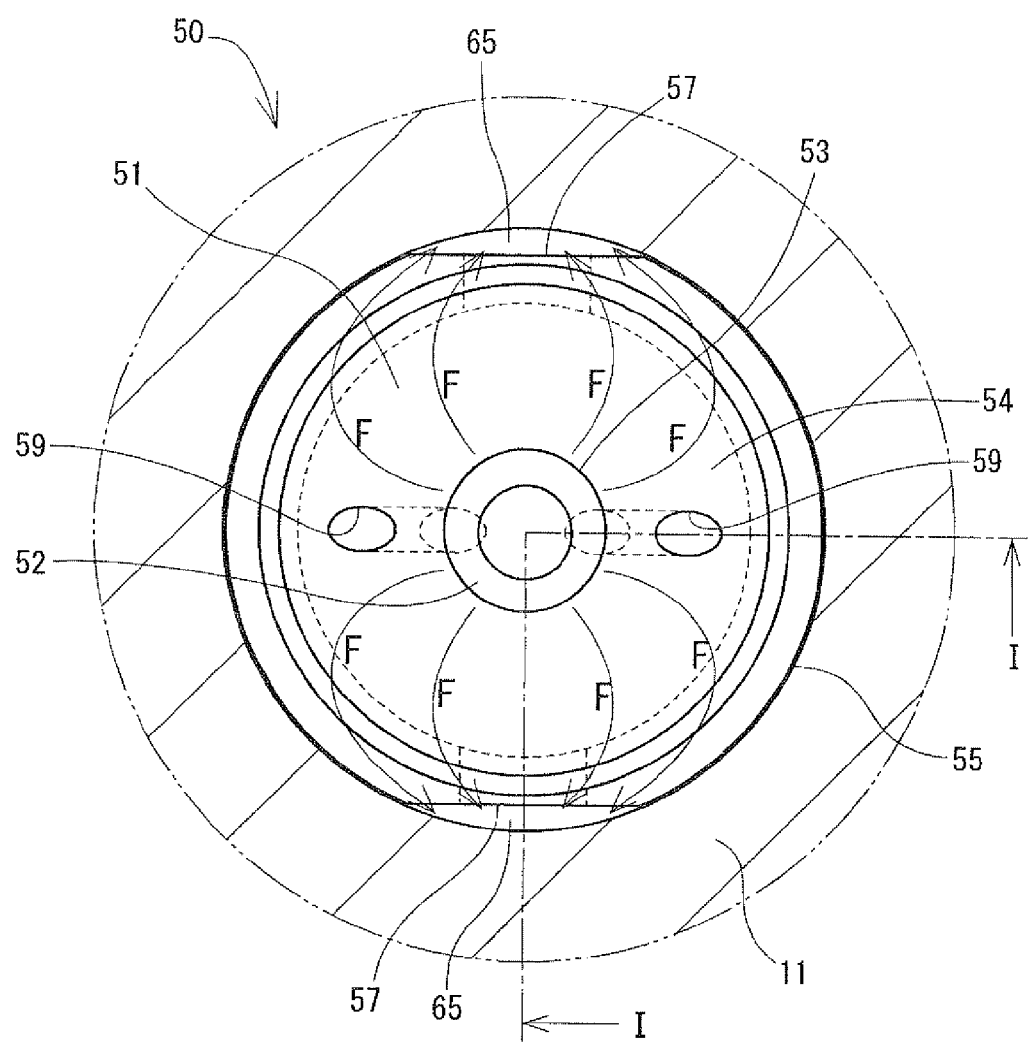
FIG. 6 is a schematic view of the pressure relief valve when viewed in a direction indicated by an arrow VI in FIG. 1.

When viewed the valve member 51 from the top side (as shown in FIG. 6), the fuel inlet ports 59 are arranged at opposite sides to each other in a radial direction and displaced from the notched portions 57 in a circumferential direction by 90 degrees. A position of the fuel inlet port 59 with respect to the notched portion 57 may be discretionary.

The adjusting pipe 81 is fixed to the inner wall of the fuel return passage 60 on a side of the valve member 51 to the plug member 80. One end (an upper end) of a spring 82 is engaged with the valve member 51, while the other end thereof is engaged with the adjusting pipe 81. Since the fuel inlet port 59 is inclined with respect to the center axis of the valve member 51, interference between the fuel inlet port 59 and the upper end of the spring 82 can be avoided. The valve member 51 is biased by the spring 82 toward the valve seat 64. The adjusting pipe 81 is press inserted into the fuel return passage 60 and a load to the spring 82 is adjusted.

According to the present embodiment, the load to the spring 82, an area of the pressure receiving portion 54 and a size of the notched portion 57 are so designed that the pressure relief valve 50 is operated (opened) at such a pressure range, which is higher than fuel pressure in the delivery pipe 4 for normal operation of the internal combustion engine but lower than fuel pressure, at which the electromagnetic injectors 5 become unable to perform fuel injection.

An operation of the high pressure pump 10 will be explained. The high pressure pump 10 repeatedly caries out a fuel intake stroke, a fuel amount adjusting stroke and a fuel discharge stroke.

(1) Fuel Intake Stroke:

When the plunger 13 is downwardly moved from its top dead center toward a bottom dead center, the fuel pressure in the fuel pressurizing chamber 121 is decreased. During this stroke, since the supply of the electric power to the coil 71 is cut off, the intake valve member 35 is moved to the valve opened position. Therefore, the fuel supply passage 100 is, communicated to the fuel pressurizing chamber 121. On the other hand, the discharge valve member 92 is seated on the valve seat 95, so that the fuel discharge passage 114 is closed. As a result, the fuel is sucked into the fuel pressurizing chamber 121 from the fuel supply passage 100.

(2) Fuel Amount Adjusting Stroke:

When the plunger 13 is upwardly moved from the bottom dead center toward the top dead center, non-supply condition of the electric power to the coil 71 is maintained for a certain time period, so that the valve opened condition of the intake valve member 35 is maintained. As a result, a part of the low pressure fuel is returned from the fuel pressurizing chamber 121 to the damping chamber 201 via the fuel intake passage 151 and the fuel communication passage 111.

When the power supply to the coil 71 is started at a predetermined time point during the fuel amount adjusting stroke, the coil 71 generates the magnetic field. Then, the movable core 73 as well as the needle 38 fixed to the movable core 73 is moved toward the fixed core 72 by magnetic force. As a result, the intake valve member 35 is seated on the valve seat 34 by the biasing force of the valve-body side spring 21 as well as a force generated by the fuel flow of the low pressure fuel, which flows from the fuel pressurizing chamber 121 to the damping chamber 201.

When the intake valve member 35 is moved to the valve closed position, the fuel flow in the fuel supply passage 100 is shut off. Accordingly, the fuel amount adjusting stroke, in which the part of the low pressure fuel is returned from the fuel pressurizing chamber 121 to the damping chamber 201, is terminated. In other words, the amount of the low pressure fuel returned from the fuel pressurizing chamber 121 to the damping chamber 201 can be controlled by adjusting the time point for starting the electric power supply to the coil 71. As a result, the amount of the fuel to be pressurized in the fuel pressurizing chamber 121 is decided.

(3) Fuel Discharge Stroke:

When the plunger 13 is further upwardly moved toward the top dead center in a condition that the communication between the fuel pressurizing chamber 121 and the damping chamber 201 is shut off, the fuel pressure in the fuel pressurizing chamber 121 will be increased. When the fuel pressure in the fuel pressurizing chamber 121 becomes higher than a predetermined value, the discharge valve member 92 is moved in the valve opening direction against the biasing force of the spring 94 and the pressure of the fuel in the fuel discharge passage 114. Then, the high pressure fuel pressurized in the fuel pressurizing chamber 121 is pumped out from the high pressure pump 10 via the fuel discharge passage 114. The high pressure fuel from the high pressure pump 10 is supplied to the delivery pipe 4 and accumulated therein. The high pressure fuel is injected into the respective cylinders of the engine through each of the injectors 5.

When the plunger 13 reaches its top dead center, the power supply to the coil 71 is cut off, so that the intake valve member 35 is moved to the valve opened position. The plunger 13 is moved downwardly again, and thereby the fuel pressure in the fuel pressurizing chamber 121 becomes lower to start the fuel intake stroke again.

As above, the strokes (1) to (3) are repeated and the high pressure pump 10 pumps out the sucked fuel. In a normal operating condition, the pressure relief valve 50 is maintained in its valve closed condition, unless the differential pressure between the fuel discharge passage 114 and the fuel pressurizing chamber 121 becomes higher than the predetermined value (a valve opening pressure for the pressure relief valve 50). A pressure wave of the high pressure fuel, which is pumped out from the fuel pressurizing chamber 121 as a result of the valve opening operation of the discharge valve member 92, is transmitted to an inlet portion of the delivery pipe 4 via the high pressure fuel supply pipe 9, reflected at the inlet portion and overlaid.

Figure 7:
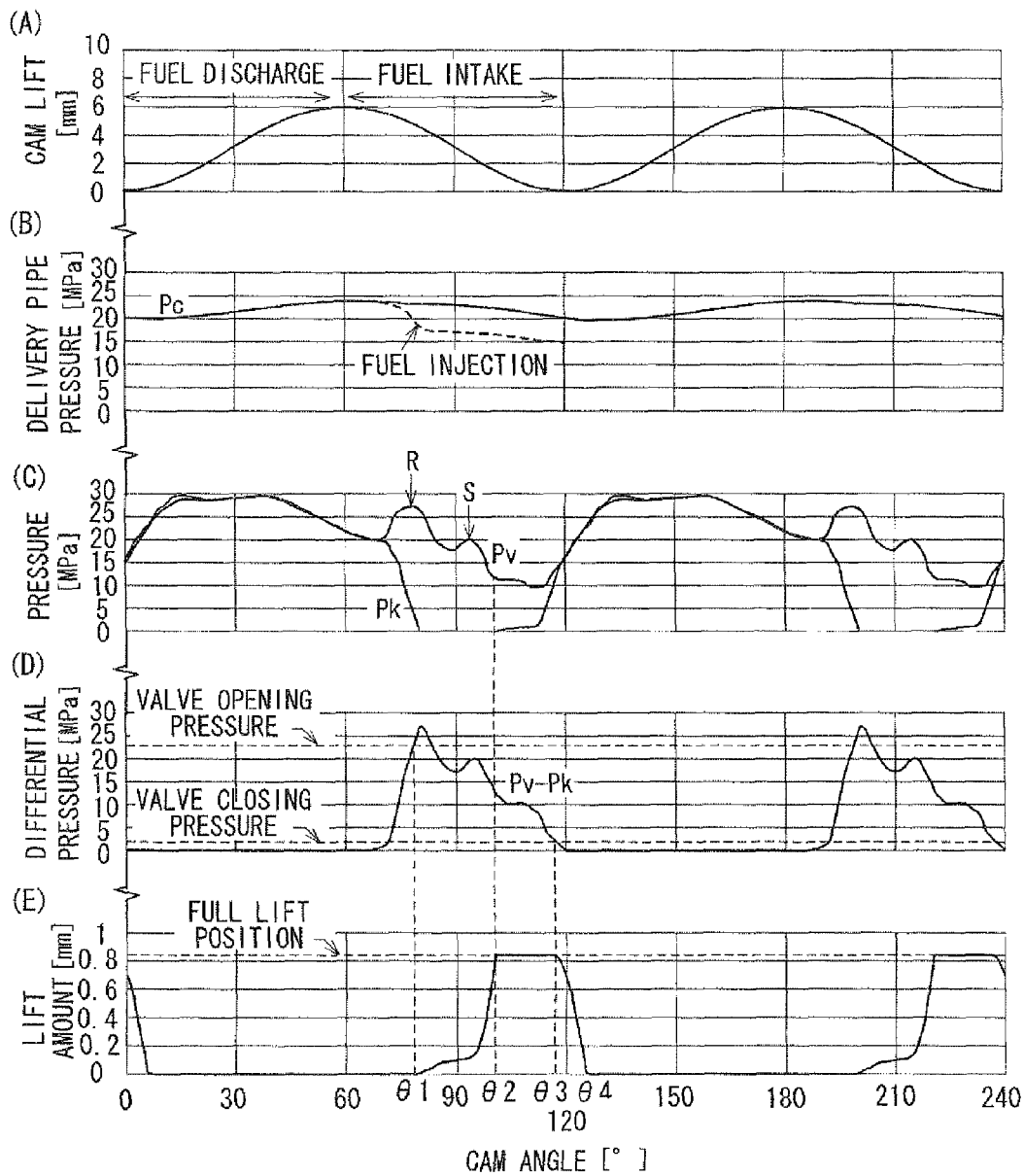
FIG. 7 is a characteristic chart showing a basic operation of the pressure relief valve of the first embodiment.

A basic operation of the pressure relief valve according to the present embodiment will be explained with reference to FIG. 7. In FIG. 7, the high pressure pump 10 is operating in a maximum pump-out condition.

As shown in (A) of FIG. 7, when the cam shaft 7 is rotated by 60 degrees, in other words, when a cam angle is changed from 0° to 60°, a cam lift amount is increased from 0 mm to 6 mm. The plunger 13 is moved from the bottom dead center to the top dead center in accordance with the above rotation of the camshaft 7, so as to carry out the fuel discharge stroke. When the cam shaft 7 is further rotated from 60° to 120°, the cam lift amount is decreased from 6 mm to 0 mm. The plunger 13 is moved from the top dead center to the bottom dead center in accordance with the rotation of the camshaft 7, to thereby carry out the fuel intake stroke.

As shown in (B) of FIG. 7, the fuel pressure "Pc" in the delivery pipe 4 is increased from about 20 (MPa) to about 24 (MPa) during the fuel discharge stroke. The fuel pressure "Pc" in the delivery pipe 4 is decreased from about 24 (MPa) to about 20 (MPa) during the fuel intake stroke. The fuel pressure in the delivery pipe 4 when the fuel injection is carried out from the injectors 5 is indicated by a dotted line.

As shown in (C) of FIG. 7, since the discharge valve member 92 is in the valve opened position during the fuel discharge stroke, the fuel pressure "Pk" in the fuel pressurizing chamber 121 is almost equal to the fuel pressure "Pv" in the fuel discharge passage 114.

The fuel pressure "Pk" in the fuel pressurizing chamber 121 is decreased by the downward movement of the plunger 13 during the fuel intake stroke. On the other hand, the fuel pressure "Pv" in the fuel discharge passage 114 becomes higher than the fuel pressure "Pk" in the fuel pressurizing chamber 121, because the discharge valve member 92 is moved to the valve closed position during the fuel intake stroke. Pressure waves of the fuel, which may be caused by the high pressure pumped-out fuel, appear in the fuel discharge passage 114, as indicated by "R" and "S". The pressure relief valve 50 is opened at the cam angle of "θ1" during the fuel intake stroke, then the fuel pressure "Pv" in the fuel discharge passage 114 starts decreasing.

As shown in (D) of FIG. 7, a differential pressure between the fuel pressure "Pk" in the fuel pressurizing chamber 121 and the fuel pressure "Pv" in the fuel discharge passage 114 is substantially zero during the fuel discharge stroke, because the discharge valve member 92 is in the valve opened position during the fuel discharge stroke.

The differential pressure ("Pv"–"Pk") between the fuel pressure "Pk" in the fuel pressurizing chamber 121 and the fuel pressure "Pv" in the fuel discharge passage 114 becomes larger than the valve opening pressure for the pressure relief valve 50 at the cam angle of "θ1" during the fuel intake stroke. When the pressure relief valve 50 is opened, a part of the high pressure fuel in the fuel discharge passage 114 flows into the fuel pressurizing chamber 121 through the pressure relief valve 50. As a result, the differential pressure ("Pv"−"Pk") between the fuel pressure "Pk" in the fuel pressurizing chamber 121 and the fuel pressure "Pv" in the fuel discharge passage 114 is decreased.

As shown in (E) of FIG. 7, when the differential pressure ("Pv"−"Pk") between the fuel pressure "Pk" in the fuel pressurizing chamber 121 and the fuel pressure "Pv" in the fuel discharge passage 114 becomes larger than the valve opening pressure for the pressure relief valve 50 at the cam angle of "θ1", the pressure relief valve 50 starts its valve opening operation. When the dynamic pressure of the fuel flowing into the fuel inlet chamber 66 is applied to the pressure receiving portion 54, a valve opening speed of the valve member 51 is increased. At a cam angle "θ2", the valve member 51 of the pressure relief valve 50 is fully moved and brought into contact with the adjusting pipe 81.

When the differential pressure ("Pv"−"Pk") between the fuel pressure "Pk" in the fuel pressurizing chamber 121 and the fuel pressure "Pv" in the fuel discharge passage 114 becomes smaller than a valve closing pressure for the pressure relief valve 50 at a cam angle "θ3", the pressure relief valve 50 starts its valve closing operation. The fuel in the fuel inlet chamber 66 quickly flows into the fuel return passage at a downstream side of the valve member 51 via the outer-surface passages 65 and the fuel inlet ports 59. As a result, a differential pressure between the fuel inlet chamber 66 and the fuel return passage at the downstream side of the valve member 51 is quickly changed to zero, or close to zero. A valve closing speed is thereby increased. The valve member 51 is seated on the valve seat 64 at a cam angle "θ4".

Figure 5:
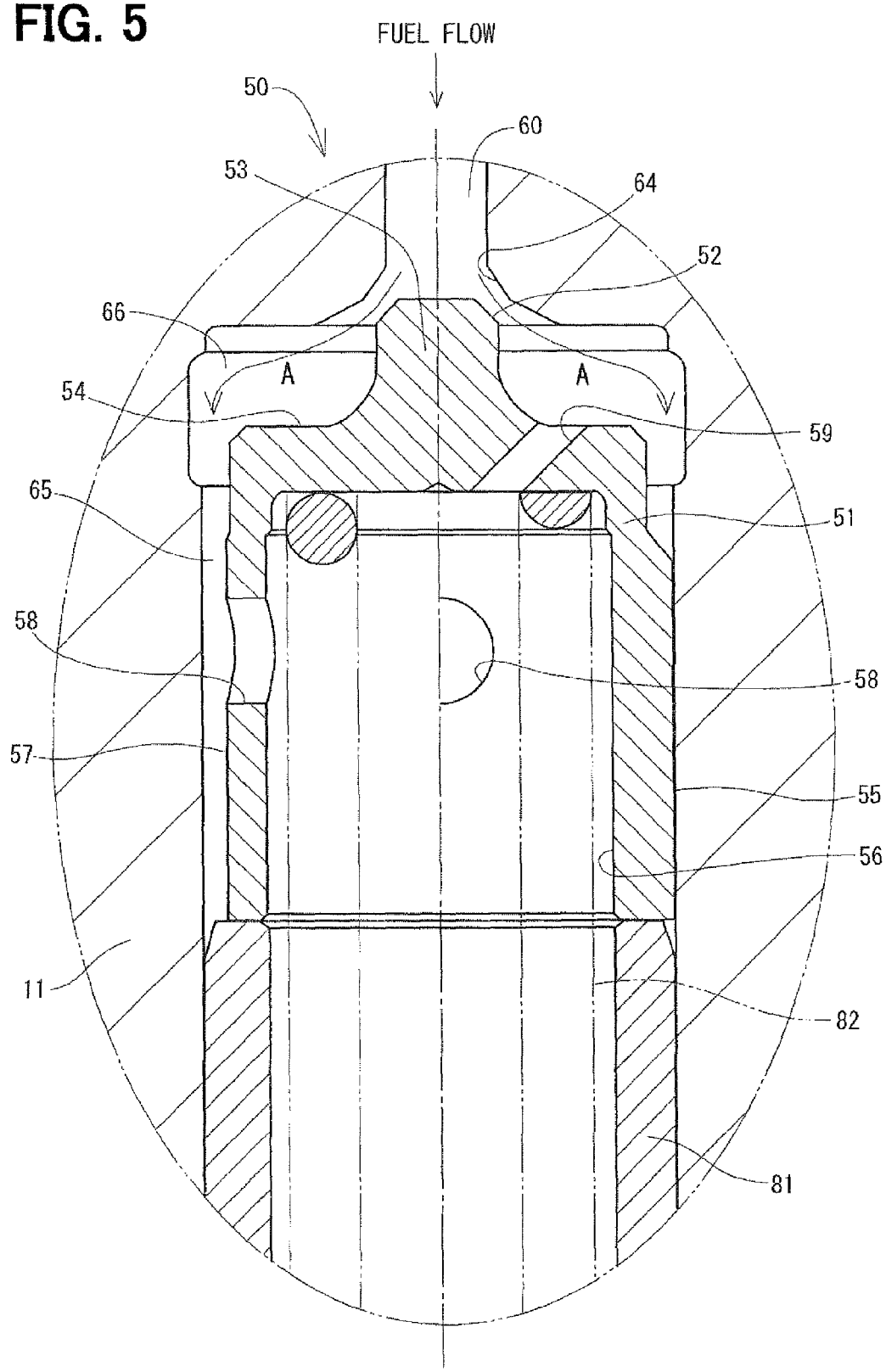
FIG. 5 is a schematic cross sectional view showing a relevant portion of a pressure relief valve according to the first embodiment of the present invention, wherein the pressure relief valve is in a valve opened condition.

When the pressure relief valve 50 is opened, the fuel flows from the fuel return passage at the upstream side of the valve seat 64 into the fuel inlet chamber 66 along the valve seat 64, as indicated by arrows A in FIG. 5. The cross sectional area of the outer-surface passage 65 is so set that a desired differential pressure is generated between the fuel inlet chamber 66 and the fuel return passage 60 at the downstream side of the valve member 51. The cross sectional area of the fuel inlet port 59 is made to be smaller than that of the outer-surface passage 65. The fuel inlet port 59 is formed in the valve member 51 such that a flow direction of the fuel inlet port 59 is opposed to the flow direction of the fuel in the fuel inlet chamber 66. Therefore, the fuel flowing in the fuel inlet chamber 66 is not likely to flow through the fuel inlet port 59. Therefore, the fuel having entered into the fuel inlet chamber 66 flows in a radial outward direction on the pressure receiving portion 54, to thereby apply the dynamic pressure of the fuel to the pressure receiving portion 54. As a result, the valve member 51 is moved by an appropriate lift amount in a short time period.

When viewed the valve member 51 in the axial direction, as indicated by arrows F in FIG. 6, the fuel having entered into the fuel inlet chamber 66 from the fuel return passage 60 at the upstream side of the valve seat 64 flows toward the outer-surface passages 65. Since the fuel inlet ports 59 are formed in the valve member 51 at such portions, which are displaced from the notched portions 57 in the circumferential direction, the fuel flowing in the fuel inlet chamber 66 hardly flows into the fuel inlet ports 59. As a result, the dynamic pressure of the fuel flowing in the fuel inlet chamber 66 can be surely applied to the pressure receiving portion 54. Therefore, the valve member 51 is fully lifted (moved to the opposite end) in a short time period, in order that the fuel flows from the fuel discharge passage 114 to the fuel pressurizing chamber 121.

When the pressure relief valve 50 is going to be closed, the fuel in the fuel inlet chamber 66 flows into the recessed portion 56 through the outer-surface passages 65 as well as the fuel inlet ports 59. The fuel inlet ports 59 allow the fuel to quickly flow into the space at the downstream of the valve member 51. As a result, a differential pressure between the fuel pressure in the fuel inlet chamber 66 and the fuel pressure in the recessed portion 56 (the space at the downstream of the valve member 51) becomes at once zero or close to zero. As a result, the valve member 51 is surely seated on the valve seat 64 within the short time period, without being blocked by the fuel pressure in the fuel inlet chamber 66. It is, therefore, possible to suppress re-open of the pressure relief valve 50 due to the pressure wave.

Figure 8:
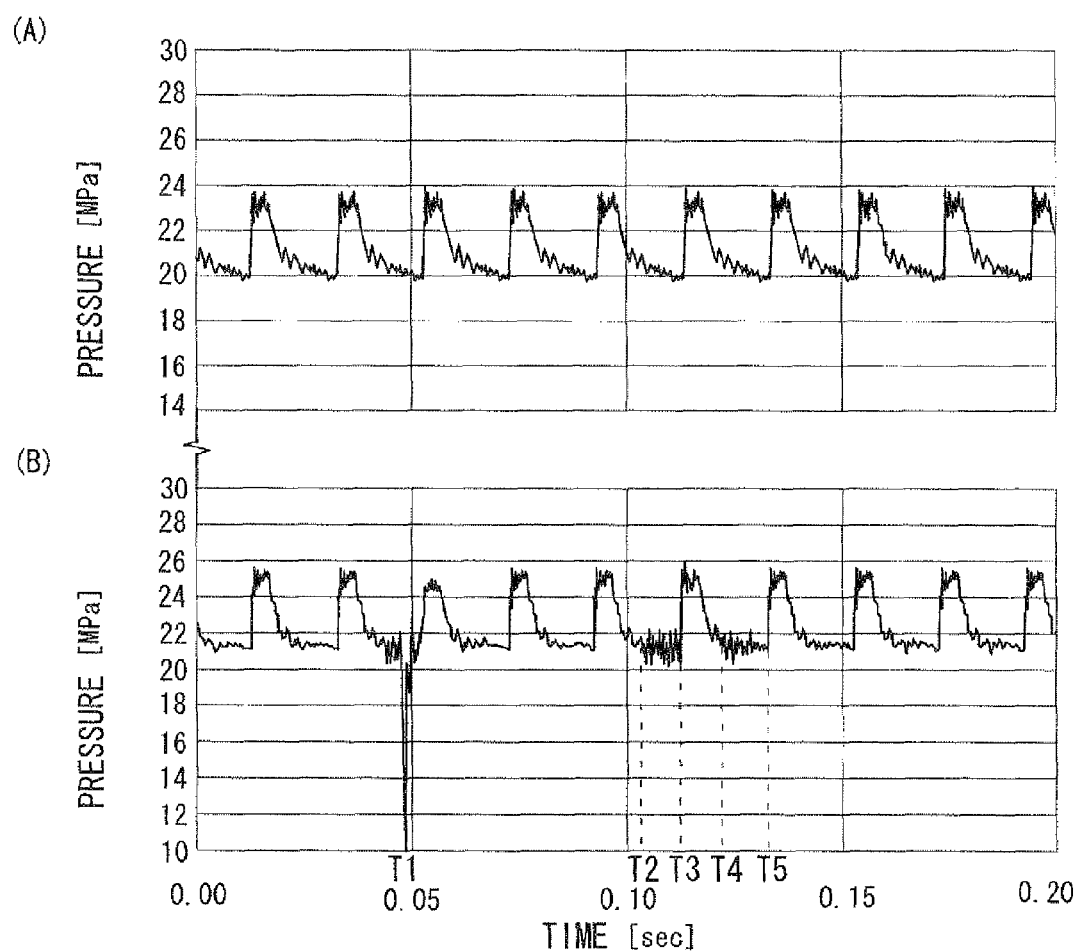
FIG. 8 is a characteristic chart comparing operations of the pressure relief valve of the present invention and a pressure relief valve of a comparative example.

FIG. 8 is a characteristic chart comparing operations of the pressure relief valve 50 of the present invention and a pressure relief valve of a comparative example, when the electric power is continuously supplied to the electromagnetic driving portion 70 of the high pressure pump 10 and thereby the vehicle is in a retreat running operation in which the high pressure pump 10 is operating with its maximum fuel discharge. FIG. 8 (A) shows the fuel pressure in the delivery pipe 4, in a case that the pressure relief valve 50 of the present embodiment is provided in the fuel supply system 1, while FIG. 8 (B) shows the fuel pressure in the delivery pipe, in a case that the pressure relief valve of the comparative example is provided in the fuel supply system. In the pressure relief valve of the comparative example, fuel inlet ports (corresponding to the fuel inlet ports 59) are not formed.

According to the comparative example, as shown in FIG. 8 (B), the fuel pressure in the delivery pipe is drastically decreased at a time point T1. This is because the pressure relief valve might have been re-opened by the pressure wave generated in the discharge passage (114) after the pressure relief valve was once closed. In addition, vibrations are generated in the fuel pressure in the delivery pipe during a period between T2 and T3 and a period between T4 and T5.

On the contrary, according to the present embodiment, as shown in FIG. 8 (A), generation of the drastic decrease of the fuel pressure as well as the vibration of the fuel pressure in the fuel delivery pipe 4 can be suppressed.

According to the present embodiment, the size, the shape, the angle and the like of the notched portions 57 and the fuel inlet ports 59 are properly adjusted so that the differential pressure is generated between the fuel inlet chamber 66 and the fuel passage at the downstream of the valve member 51 when the pressure relief valve 50 is opened. As a result, the dynamic pressure of the fuel, which has entered into the fuel inlet chamber 66 from the fuel passage at the upstream of the valve member 51, is applied to the pressure receiving portion 54 and the valve member 51 is moved by the appropriate stroke amount in the short time period.

A time period, during which the fuel returns from the delivery pipe 4 to the fuel pressurizing chamber 121 through the pressure relief valve 50, is a limited time period of the fuel intake stroke. The stroke amount as well as a valve opening speed of the pressure relief valve 50 is adjusted so that a flow amount of the fuel passing through the pressure relief valve 50 can be fitted to a volume change of the fuel pressurizing chamber 121. It becomes, therefore, possible to return the fuel from the delivery pipe side to the fuel pressurizing chamber 121 for one fuel intake stroke, wherein the fuel amount to be returned can be controlled at such an amount equal to or close to the discharge amount of one plunger stroke. Accordingly, it is possible to quickly return the fuel from the discharge passage 114 to the fuel pressurizing chamber 121 to thereby smoothly decrease the fuel pressure in the delivery pipe 4.

According to the present embodiment, the angle formed between the fuel inlet port 59 and the pressure receiving portion 54, which extends from the rear end of the shaft portion 53 in a direction perpendicular to the shaft portion 53, is formed as the acute angle, and the fuel inlet ports 59 are displaced from the notched portions 57 in the circumferential direction. As a result, when the pressure relief valve 50 is opened, the dynamic pressure of the fuel entering into the fuel inlet chamber 66 from the fuel passage at the upstream side of the valve seat 64 can be surely applied to the pressure receiving portion 54.

On the other hand, when the pressure relief valve 50 is going to be closed, the fuel in the fuel inlet chamber 66 flows to the fuel passage at the downstream side of the valve member 51 through the outer-surface passages 65 as well the fuel inlet ports 59. In particular, it is possible to have the fuel in the fuel inlet chamber 66 to quickly flow to the fuel passage at the downstream side of the valve member 51 through the fuel inlet ports 59. As a result, a valve closing speed of the pressure relief valve 50 is increased, because the movement of the valve member 51 is not blocked by the fuel pressure in the fuel inlet chamber 66. Therefore, the generation of the re-open of the pressure relief valve 50 as well as the vibration of the fuel pressure in the delivery pipe 4 can be suppressed. Even in the retreat running operation of the vehicle, it is possible to maintain the fuel pressure in the delivery pipe 4 at a predetermined pressure, which is set by the pressure relief valve 50, so that the fuel can be properly injected from the injectors 5.

Second Embodiment

Figure 9:
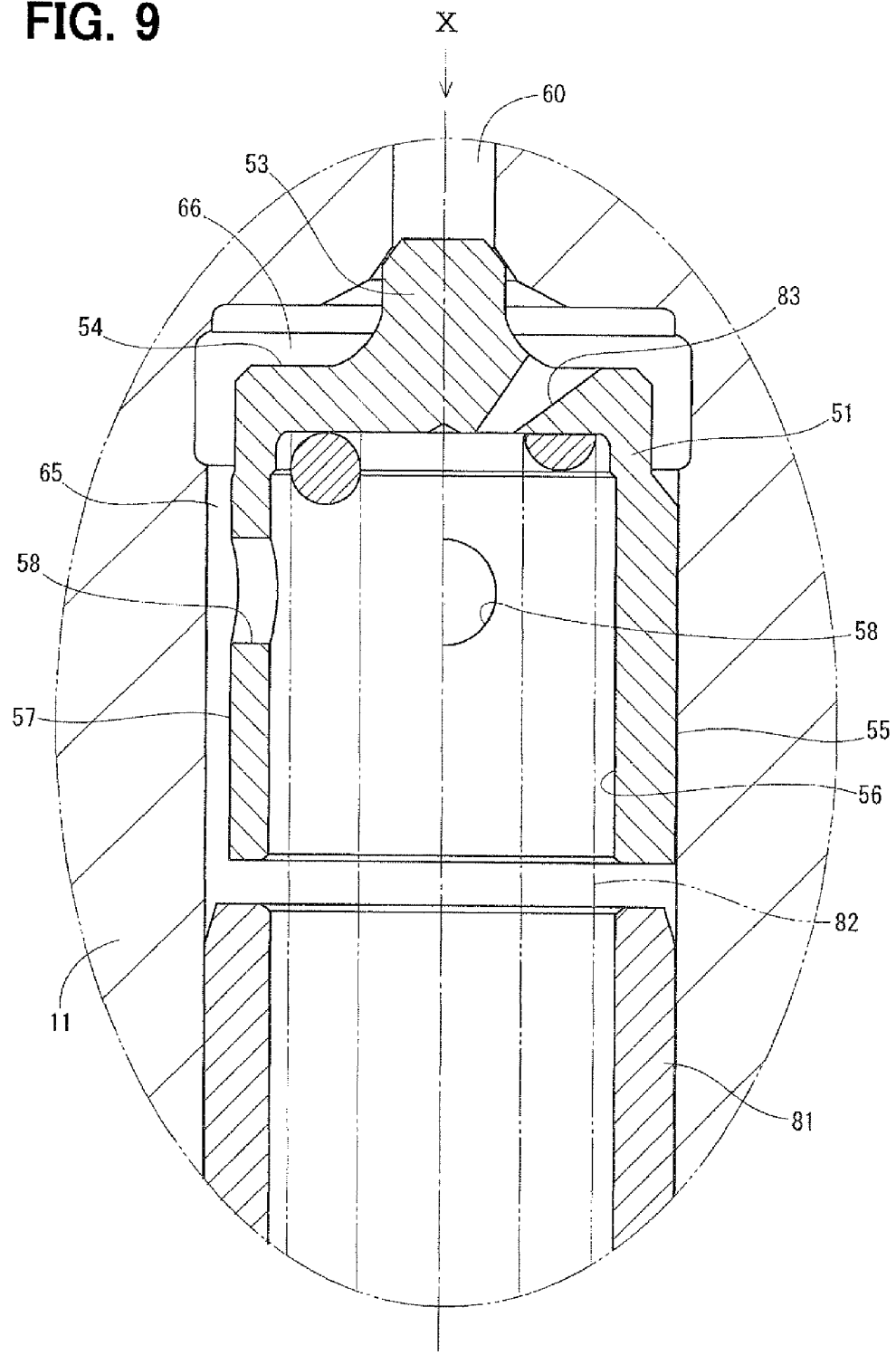
FIG. 9 is a schematic cross sectional view showing a relevant portion of a pressure relief valve according to a second embodiment of the present invention.
Figure 10:
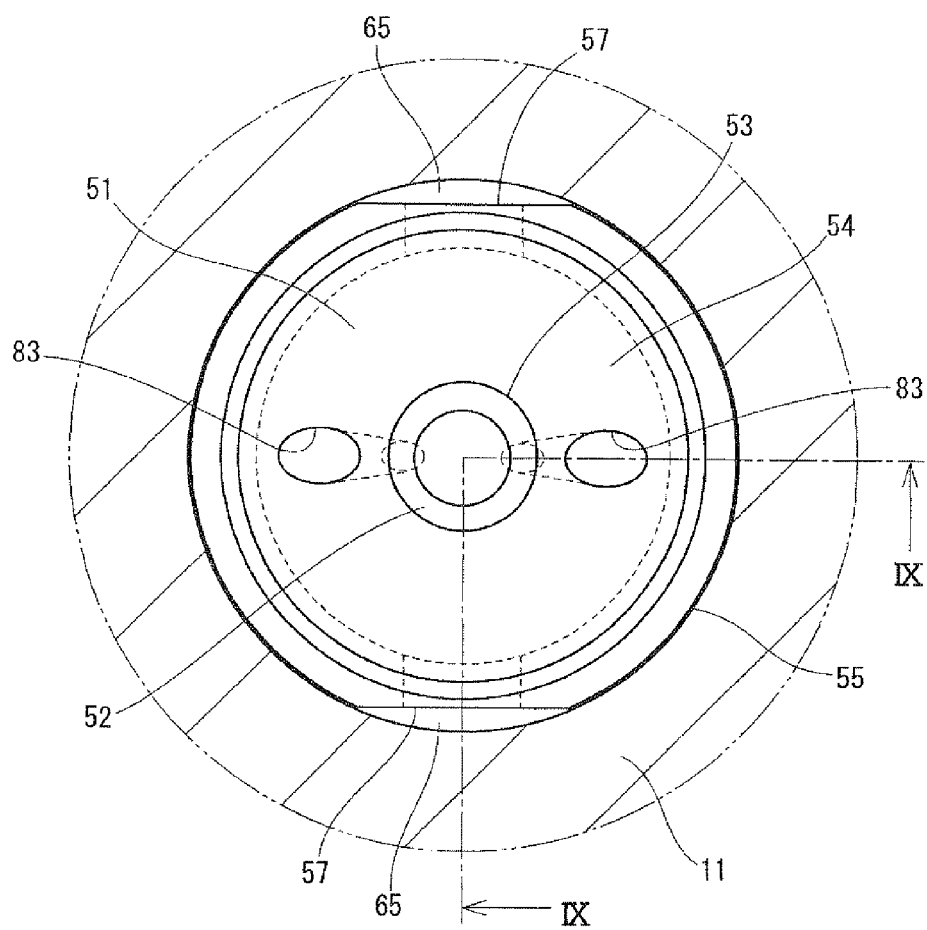
FIG. 10 is a schematic view of the pressure relief valve of the second embodiment when viewed in a direction indicated by an arrow X in FIG. 9.

A pressure relief valve according to a second embodiment of the present invention will be explained with reference to FIGS. 9 and 10.

According to the second embodiment, a fuel inlet port 83 of the valve member 51 is formed in a tapered shape, which has a larger cross sectional area on a side of the pressure receiving portion 54 than that on a side of the recessed portion 56. A center axis of the fuel inlet port 83 is inclined from the pressure receiving portion 54 toward the center axis of the valve member 51. An angle formed between the center axis of the fuel inlet port 83 and the pressure receiving portion 54 is an acute angle. When viewed the valve member 51 in the axial direction, as shown in FIG. 10, the fuel inlet ports 83 are formed in the valve member 51 at such portions, which are displaced from the notched portions 57 in the circumferential direction.

According to the present embodiment, since the cross sectional area of the fuel inlet port 83 on the side of the pressure receiving portion 54 is larger than that on the side of the recessed portion 56, it is easier for the fuel in the fuel inlet chamber 66 to flow through the fuel inlet port 83 into the fuel passage at the downstream side of the valve member 51. Therefore, the movement of the valve member 51 may not be blocked by the fuel pressure in the fuel inlet chamber 66 and the valve closing speed of the pressure relief valve 50 is increased.

Third Embodiment

Figure 11:
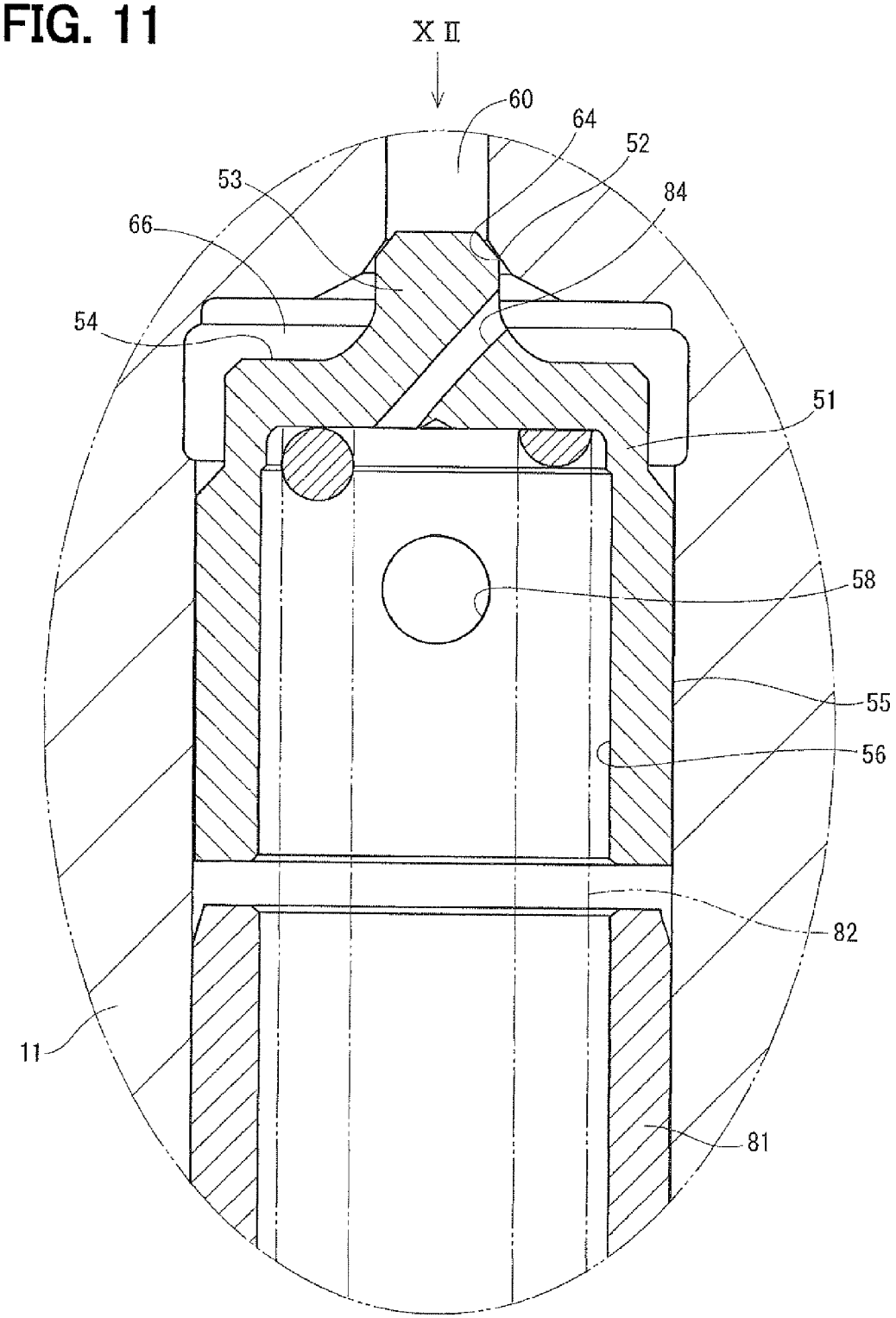
FIG. 11 is a schematic cross sectional view showing a relevant portion of a pressure relief valve according to a third embodiment of the present invention.
Figure 12:
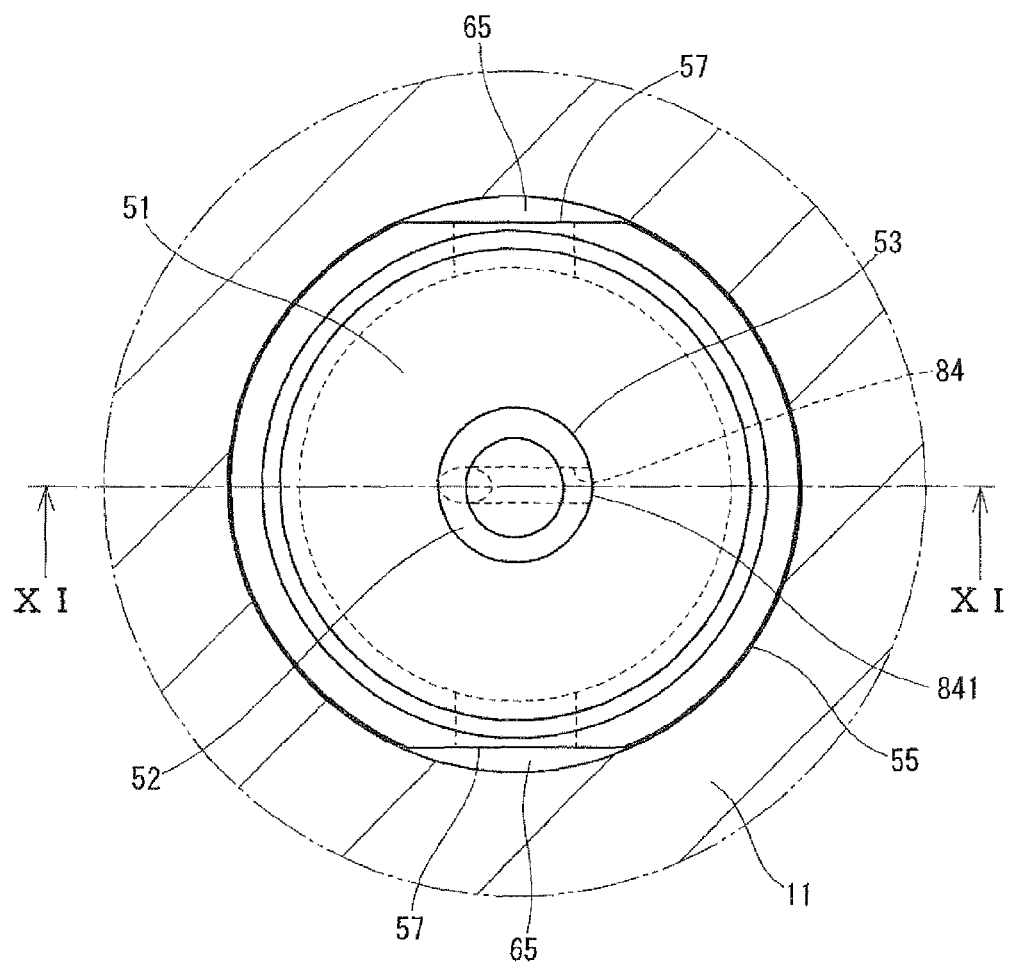
FIG. 12 is a schematic view of the pressure relief valve of the third embodiment when viewed in a direction indicated by an arrow XII in FIG. 11.

A pressure relief valve according to a third embodiment of the present invention will be explained with reference to FIGS. 11 and 12.

According to the present embodiment, one end of a fuel inlet port 84 is opened at the shaft portion 53 of the valve member 51, while the other end thereof is opened at the inner surface of the recessed portion 56. A center axis of the fuel inlet port 84 is inclined from the shaft portion 53 toward the center axis of the valve member 51. When viewed the valve member 51 in the axial direction, as shown in FIG. 12, the fuel inlet port 84 is formed in the valve member 51 at such a portion, which is displaced from the notched portions 57 in the circumferential direction. More exactly, a direction of the center axis of the fuel inlet port 84 is at a right angle to a line connecting the pair of the notched portions 57 with each other.

When the pressure relief valve 50 is opened, the fuel, which enters into the fuel inlet chamber 66 from the fuel passage at the upstream side of the valve seat 64 and along the valve seat 64, flows in the radial outward direction to thereby apply the dynamic pressure to the pressure receiving portion 54. Since one end of the fuel inlet port 84 is opened at the shaft portion 53, the fuel flowing in the fuel inlet chamber 66 hardly enters into the fuel inlet port 84. In addition, since the one end of the fuel inlet port 84 is not opened at the pressure receiving portion 54, the dynamic pressure of the fuel flowing in the fuel inlet chamber 66 can be surely applied to the pressure receiving portion 54. Accordingly, the valve member 51 can be moved by the appropriate stroke in a short time period.

When the pressure relief valve 50 is going to be closed, the fuel in the fuel inlet chamber 66 will flow into the recessed portion 56 through the fuel inlet port 84. Therefore, the movement of the valve member 51 may not be blocked by the fuel pressure in the fuel inlet chamber 66 and the valve closing speed of the pressure relief valve 50 is increased.

Fourth Embodiment

Figure 13:
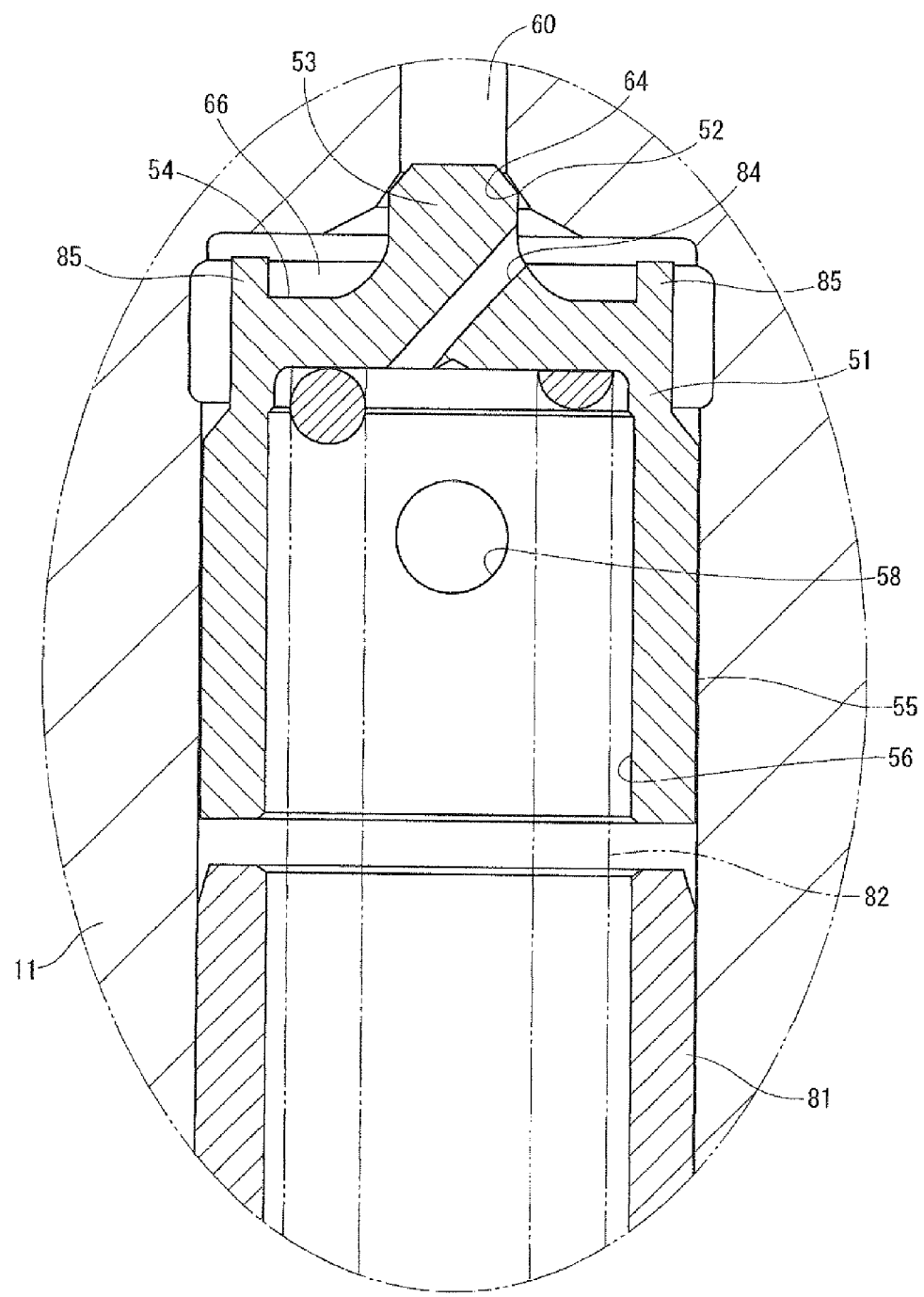
FIG. 13 is a schematic cross sectional view showing a relevant portion of a pressure relief valve according to a fourth embodiment of the present invention.

A pressure relief valve according to a fourth embodiment of the present invention will be explained with reference to FIG. 13.

According to the present embodiment, an annular projecting wall 85 is formed at an outer periphery of the pressure receiving portion 54, wherein the annular projecting wall 85 projects in an axial direction of the valve member 51 toward the valve seat 64. The fuel inlet port 84 is the same to that in the third embodiment. One end of the fuel inlet port 84 is opened at the shaft portion 53 of the valve member 51, while the other end thereof is opened at the inner surface of the recessed portion 56.

When the pressure relief valve 50 is opened, the dynamic pressure of the fuel, which enters into the fuel inlet chamber 66 from the fuel passage at the upstream side of the valve seat 64 and along the valve seat 64, is applied to the pressure receiving portion 54 between the shaft portion 53 and the annular projecting wall 85. In addition, since the one end of the fuel inlet port 84 is not opened at the pressure receiving portion 54, the dynamic pressure of the fuel flowing in the fuel inlet chamber 66 can be surely applied to the pressure receiving portion 54. Accordingly, the valve member 51 can be moved by the appropriate stroke in a short time period.

When the pressure relief valve 50 is going to be closed, the fuel in the fuel inlet chamber 66 will flow into the recessed portion 56 through the fuel inlet port 84. Therefore, the movement of the valve member 51 may not be blocked by the fuel pressure in the fuel inlet chamber 66 and the valve closing speed of the pressure relief valve 50 is increased.

Fifth Embodiment

Figure 14:
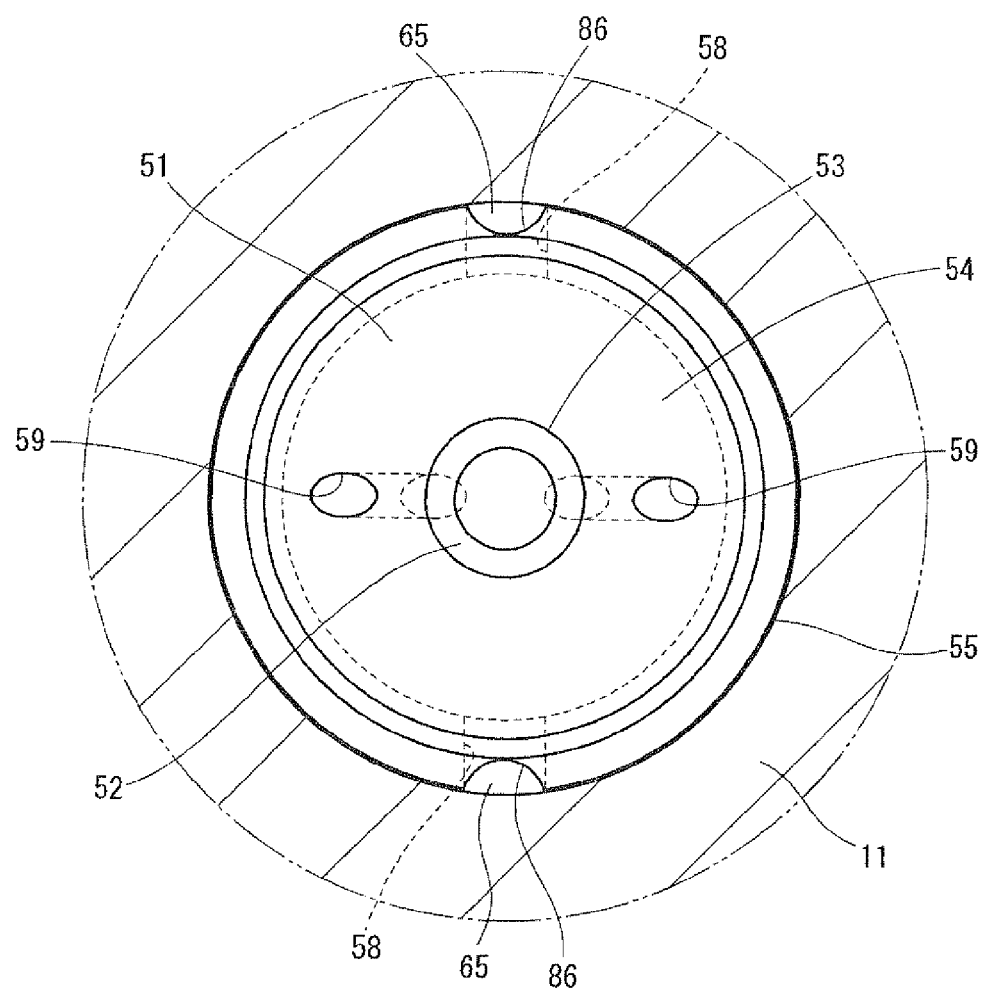
FIG. 14 is a schematic top plan view showing a pressure relief valve according to a fifth embodiment of the present invention.
Figure 15:
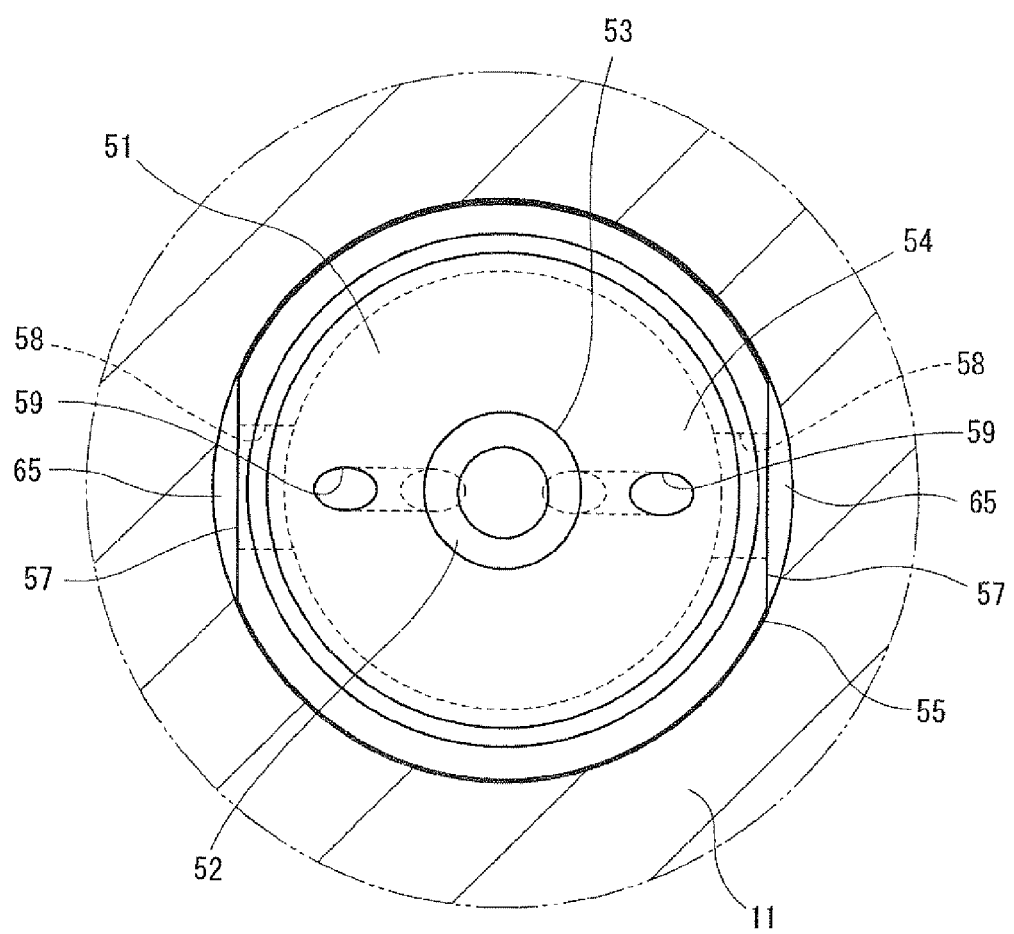
FIG. 15 is a schematic top plan view showing a pressure relief valve according to a sixth embodiment of the present invention.
Figure 16:
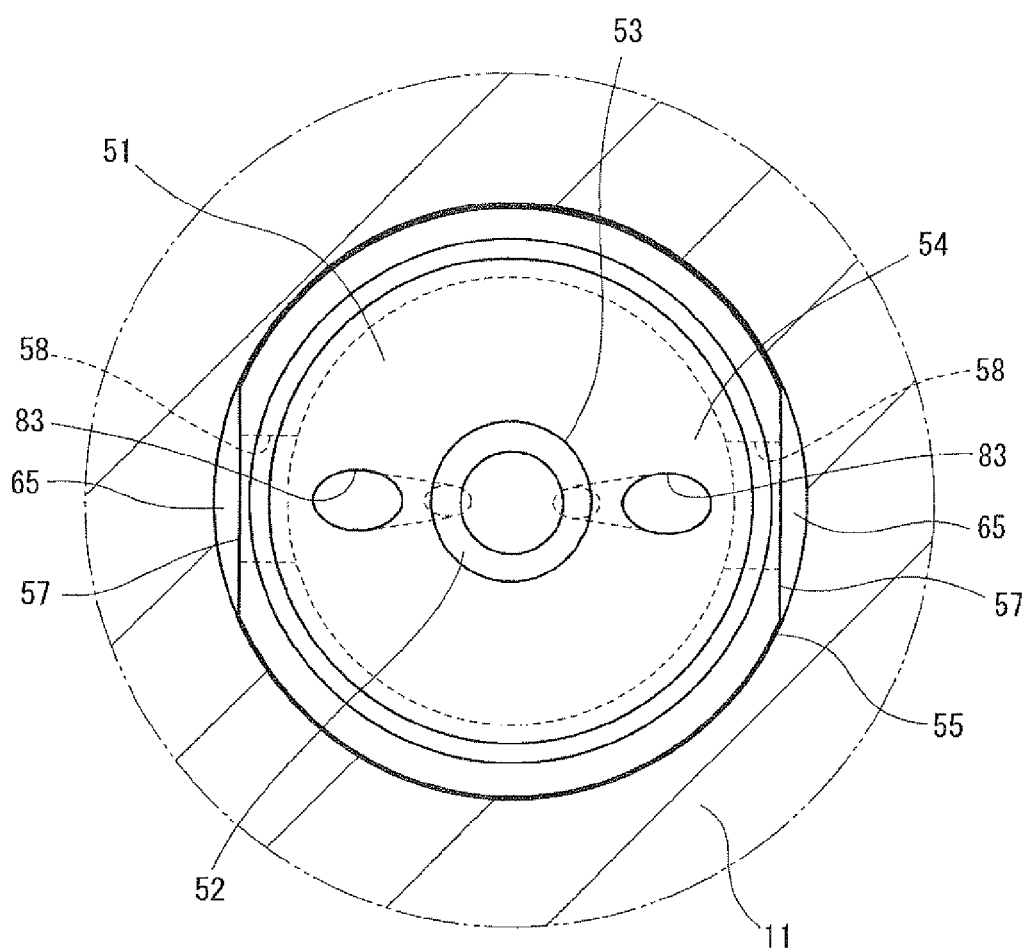
FIG. 16 is a schematic top plan view showing a pressure relief valve according to a seventh embodiment of the present invention.
Figure 17:
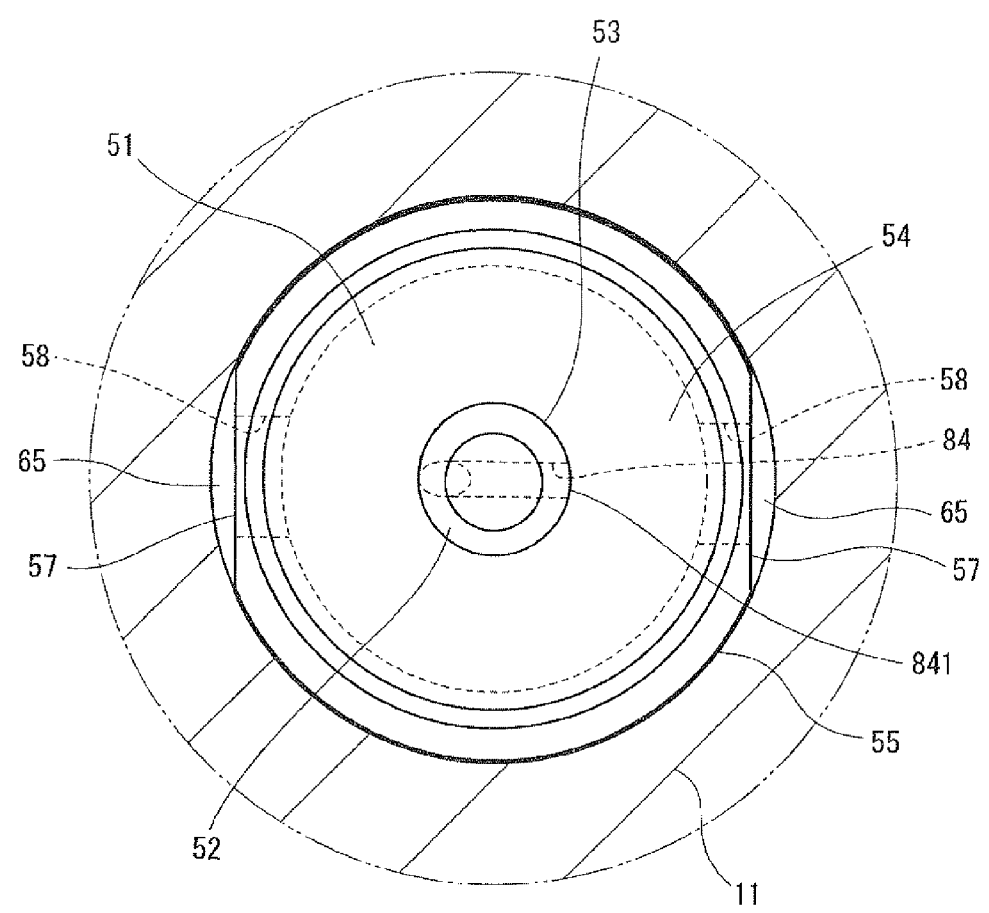
FIG. 17 is a schematic top plan view showing a pressure relief valve according to an eighth embodiment of the present invention.
Figure 18:
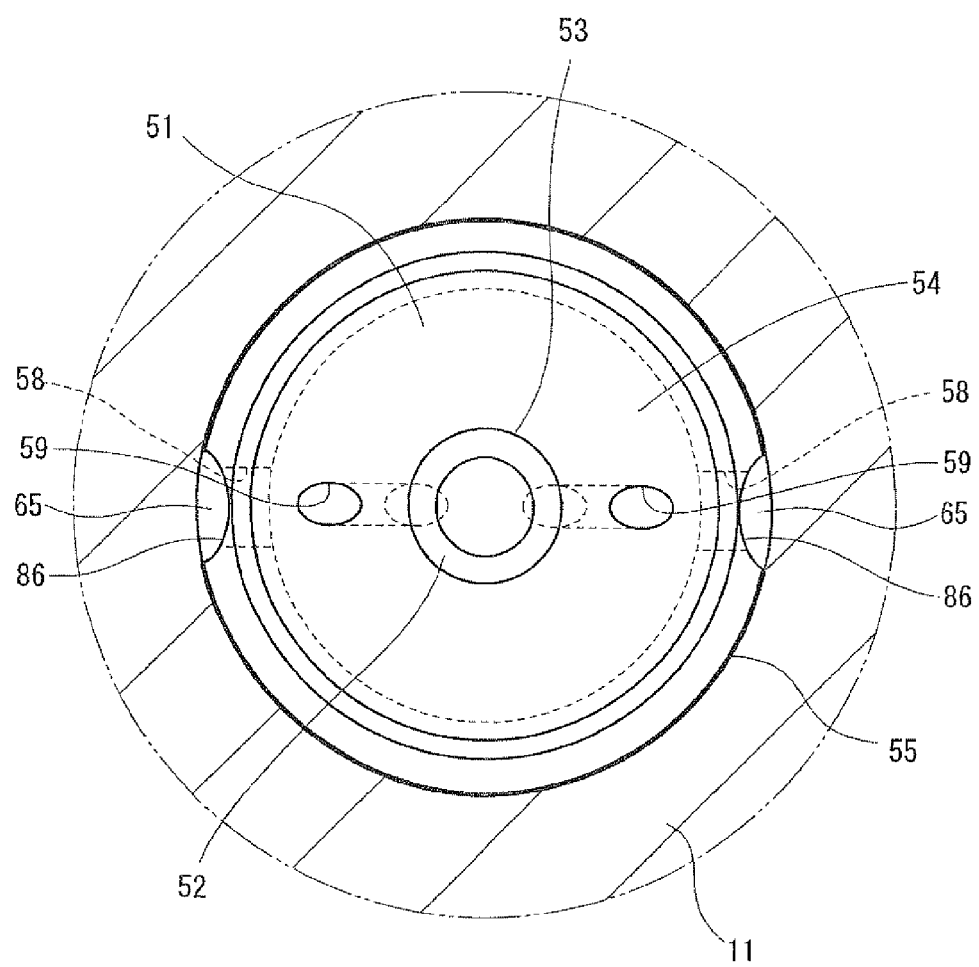
FIG. 18 is a schematic top plan view showing a pressure relief valve according to a ninth embodiment of the present invention.

A pressure relief valve according to a fifth embodiment of the present invention will be explained with reference to FIG. 14.

According to the present embodiment, each of notched portions 86 is formed by, not a flat surface, but a curved surface at an outer wall of the valve member 51. The outer-surface passage 65 is formed between the notched portion 86 and the inner wall of the fuel return passage 60. The communication holes 58 are formed in the valve member 51 for communicating the outer-surface passages 65 with the inside of the recessed portion 56.

Even according to the present embodiment, the cross sectional area of the outer-surface passage 65 can be set to adjust the dynamic pressure applied to the pressure receiving portion 54.

Sixth to Ninth Embodiments

Pressure relief valves according to sixth to ninth embodiments of the present invention will be explained with reference to FIGS. 15 to 18.

According to the sixth to ninth embodiments, the notched portions 57 and 86 and the fuel inlet ports 59, 83 and 84 are formed at such positions, which are on the same positions in the circumferential direction. However, the notched portions 57 and 86 and the fuel inlet ports 59, 83 and 84 may be formed at such optional positions, which are displaced from each other in the circumferential direction of the valve member 51.

Across sectional area of the outer-surface passage 65 formed between the inner wall of the fuel return passage 60 and the notched portion 57 or 86 is smaller than that of the fuel inlet port 59, 83 or 84. The size, the shape, the angle and the like of the notched portion 57 or 86 and the fuel inlet ports 59, 83 or 84 are properly adjusted so that the differential pressure is generated between the fuel inlet chamber 66 and the fuel passage at the downstream of the valve member 51 when the pressure relief valve 50 is opened. As a result, the dynamic pressure of the fuel, which has entered into the fuel inlet chamber 66 from the fuel passage at the upstream of the valve member 51, is surely applied to the pressure receiving portion 54. The valve member 51 can be moved by the appropriate stroke amount in a short time period. In other words, it becomes possible to increase the valve opening speed of the pressure relief valve and to control the stroke amount of the valve member. The flow amount of the fuel passing through the pressure relief valve 50 can be fitted to the volume change of the fuel pressurizing chamber 121. It becomes, therefore, possible to quickly return the fuel from the delivery pipe side to the fuel pressurizing chamber 121 for one fuel intake stroke, wherein the fuel amount to be returned can be controlled at such an amount equal to or close to the discharge amount of one plunger stroke. The fuel pressure in the delivery pipe 4 can be quickly and smoothly reduced.

When the pressure relief valve 50 is going to be closed, the fuel in the fuel inlet chamber 66 will flow into the fuel passage at the downstream side of the valve member 51 through the outer-surface passage 65 and the fuel inlet port 59, 83 or 84. In particular, it is possible to have the fuel in the fuel inlet chamber 66 to quickly flow to the fuel passage at the downstream side of the valve member 51 through the fuel inlet port 59, 83 or 84. As a result, a differential pressure between the fuel pressure in the fuel inlet chamber 66 and the fuel pressure in the recessed portion 56 becomes at once zero or close to zero. In other words, it is possible to increase the valve closing speed of the pressure relief valve. Therefore, the generation of the re-open of the pressure relief valve 50 due to the pressure wave in the discharge passage as well as the vibration of the fuel pressure in the delivery pipe 4 can be suppressed.

Further Embodiments

According to the first embodiment, the pressure relief valve 50 is provided in the high pressure pump 10. A fuel return pipe may be provided between the delivery pipe 4 and the fuel tank 4, and the pressure relief valve 50 may be provided in such fuel return pipe. Alternatively, another fuel return pipe may be provided between the high pressure fuel supply pipe 9 and the fuel supply passage 100 of the high pressure pump 10, and the pressure relief valve 50 may be provided in such fuel return pipe.

As above, the present invention should not be limited to the above explained embodiments, but the present invention can be modified in various ways without departing from the spirit of the invention, in addition to combinations of the above explained embodiments to each other.

What is claimed is:

1. A pressure relief valve for a high pressure pump, in which a fuel flow from a high pressure side to a low pressure side is allowed but a fuel flow from the low pressure side to the high pressure side is prohibited, comprising:

a valve seat formed at an inner wall of a fuel return passage provided between the high pressure side and the low pressure side;

a valve member for closing the fuel return passage when the valve member is seated on the valve seat, and for opening the fuel return passage when the valve member is separated from the valve seat; and a biasing means for biasing the valve member toward the valve seat at a predetermined biasing force, wherein the valve member comprises;

a shaft portion extending in an axial direction of the fuel return passage toward the valve seat, a forward end of the shaft portion being seated on and/or separated from the valve seat;

a pressure receiving portion extending from a rear end of the shaft portion in a radial outward direction toward an inner wall of the fuel return passage, so that a fuel inlet chamber is formed in the fuel return passage between the valve seat and the pressure receiving portion;

a guide portion extending from an outer periphery of the pressure receiving portion in an axial direction of the fuel return passage, which is opposite to a direction toward the valve seat, wherein the guide portion slides on the inner wall of the fuel return passage;

a notched portion formed at an outer wall of the guide portion so as to form an outer-surface passage for communicating the fuel inlet chamber to the fuel return passage at a downstream side of the valve member;

a fuel inlet port having one end opened at the shaft portion or the pressure receiving portion and another end opened to the fuel return passage at the downstream side of the valve member, so that the fuel inlet port communicates the fuel inlet chamber to the fuel return passage at the downstream side of the valve member.

2. The pressure relief valve according to the claim 1, wherein
a cross sectional area of the fuel inlet port is made to be smaller than that of the outer-surface passage formed by the notched portion.

3. The pressure relief valve according to the claim 1, wherein
the pressure receiving portion is formed by a flat surface, which extends from the rear end of the shaft portion in the radial outward direction, and which is perpendicular to the axial direction of the fuel return passage.

4. The pressure relief valve according to the claim 1, wherein
the valve member further comprises a communication hole for allowing the fuel to flow from the notched portion into an inside of the valve member.

5. The pressure relief valve according to the claim 1, wherein
the notched portion is formed by a flat surface at the outer wall of the guide portion of the valve member.

6. The pressure relief valve according to the claim 1, wherein
the fuel inlet port is inclined from the one end to the other end in a direction toward a center axis of the valve member.

7. The pressure relief valve according to the claim 1, wherein
the valve member has a recessed portion formed at the downstream side of the valve member, and
the other end of the fuel inlet port is opened at an inner surface of the recessed portion.

8. The pressure relief valve according to the claim 1, wherein
the one end of the fuel inlet port is opened at the shaft portion.

9. The pressure relief valve according to the claim 8, wherein
the pressure receiving portion has an annular projecting wall extending from an outer periphery of the pressure receiving portion in the axial direction of the valve member toward to the valve seat.

10. The pressure relief valve according to the claim 1, wherein
the fuel inlet port is formed in a tapered shape, wherein a cross sectional area at the one end on an upstream side is larger than that at the other end on a downstream side.

11. A high pressure pump comprising:
a plunger movable in an axial direction in a reciprocating manner;
a pump body having a fuel pressurizing chamber for pressurizing the fuel in accordance with a reciprocal movement of the plunger;
a fuel discharge valve for discharging pressurized fuel from the fuel pressurizing chamber; and
the pressure relief valve according to the claim 1, wherein the pressure relief valve is provided between a downstream side and an upstream side of the fuel discharge valve so that the pressure relief valve allows fuel flow from the downstream side to the upstream side of the fuel discharge valve, while fuel flow from the upstream side to the downstream side of the fuel discharge valve is prohibited.

* * * * *